US009948895B1

(12) United States Patent
Wiser

(10) Patent No.: US 9,948,895 B1
(45) Date of Patent: Apr. 17, 2018

(54) FULLY INTEGRATED PINHOLE CAMERA FOR EYE-MOUNTABLE IMAGING SYSTEM

(71) Applicant: Verily Life Sciences LLC, Mountain View, CA (US)

(72) Inventor: Robert Francis Wiser, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 781 days.

(21) Appl. No.: 13/920,812

(22) Filed: Jun. 18, 2013

(51) Int. Cl.
*H04N 7/18* (2006.01)
*H04N 9/47* (2006.01)

(52) U.S. Cl.
CPC ..................... *H04N 7/18* (2013.01)

(58) Field of Classification Search
CPC .................. G02B 1/043; G02B 2027/0138
USPC ...................................... 351/159.02
See application file for complete search history.

(56) References Cited

U.S. PATENT DOCUMENTS

| | | |
|---|---|---|
| 3,958,560 A | 5/1976 | March |
| 4,014,321 A | 3/1977 | March |
| 4,055,378 A | 10/1977 | Feneberg et al. |
| 4,122,942 A | 10/1978 | Wolfson |
| 4,136,250 A | 1/1979 | Mueller et al. |
| 4,143,949 A | 3/1979 | Chen |
| 4,153,641 A | 5/1979 | Deichert et al. |
| 4,214,014 A | 7/1980 | Hofer et al. |
| 4,309,085 A | 1/1982 | Morrison |
| 4,312,575 A | 1/1982 | Peyman et al. |
| 4,401,371 A | 8/1983 | Neefe |
| 4,463,149 A | 7/1984 | Ellis |
| 4,555,372 A | 11/1985 | Kunzler et al. |
| 4,604,479 A | 8/1986 | Ellis |

(Continued)

FOREIGN PATENT DOCUMENTS

| | | |
|---|---|---|
| EP | 0369942 | 5/1990 |
| EP | 0686372 | 12/1995 |

(Continued)

OTHER PUBLICATIONS

Fife, Keith, et al. "A Multi-Aperture Image Sensor with 0.7 Pixels in 0.11 CMOS Technology." Solid-State Circuits, IEEE Journal of 43.12 (2008): 2990-3005.*

(Continued)

*Primary Examiner* — Tat C Chio
*Assistant Examiner* — Fabio S Lima
(74) *Attorney, Agent, or Firm* — McDonnell Boehnen Hulbert & Berghoff LLP

(57) ABSTRACT

An eye-mountable device includes an image sensor situated in a polymeric material configured to be mounted to a surface of an eye. The image sensor can be disposed on a substrate at least partially embedded in the polymeric material. The image sensor can include a photo-sensitive area occupied by a plurality of photo-sensitive elements. The photo-sensitive area is illuminated by light entering a non-focusing aperture in an opaque screen. The non-focusing aperture can be smaller than the photo-sensitive area such that each of the photo-sensitive elements receives light entering the non-focusing aperture from a respective direction. The direction-specific measurements of received light obtained by the multiple photo-sensitive elements can thereby be used to form an image.

17 Claims, 13 Drawing Sheets

(56) References Cited

U.S. PATENT DOCUMENTS

| | | | |
|---|---|---|---|
| 4,632,844 A | 12/1986 | Yanagihara et al. | |
| 4,686,267 A | 8/1987 | Ellis et al. | |
| 4,740,533 A | 4/1988 | Su et al. | |
| 4,826,936 A | 5/1989 | Ellis | |
| 4,996,275 A | 2/1991 | Ellis et al. | |
| 4,997,770 A | 3/1991 | Giles et al. | |
| 5,032,658 A | 7/1991 | Baron et al. | |
| 5,034,461 A | 7/1991 | Lai et al. | |
| 5,070,215 A | 12/1991 | Bambury et al. | |
| 5,135,297 A | 8/1992 | Valint et al. | |
| 5,177,165 A | 1/1993 | Valint et al. | |
| 5,177,168 A | 1/1993 | Baron et al. | |
| 5,219,965 A | 6/1993 | Valint et al. | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Kunzler et al. | |
| 5,326,584 A | 7/1994 | Kamel et al. | |
| 5,336,797 A | 8/1994 | McGee et al. | |
| 5,346,976 A | 9/1994 | Ellis et al. | |
| 5,358,995 A | 10/1994 | Lai et al. | |
| 5,364,918 A | 11/1994 | Valint et al. | |
| 5,387,662 A | 2/1995 | Kunzler et al. | |
| 5,449,729 A | 9/1995 | Lai | |
| 5,472,436 A | 12/1995 | Fremstad | |
| 5,512,205 A | 4/1996 | Lai | |
| 5,585,871 A | 12/1996 | Linden | |
| 5,610,252 A | 3/1997 | Bambury et al. | |
| 5,616,757 A | 4/1997 | Bambury et al. | |
| 5,682,210 A | 10/1997 | Weirich | |
| 5,708,094 A | 1/1998 | Lai et al. | |
| 5,710,302 A | 1/1998 | Kunzler et al. | |
| 5,714,557 A | 2/1998 | Kunzler et al. | |
| 5,726,733 A | 3/1998 | Lai et al. | |
| 5,760,100 A | 6/1998 | Nicholson et al. | |
| 5,908,906 A | 6/1999 | Kunzler et al. | |
| 5,981,669 A | 11/1999 | Valint et al. | |
| 6,087,941 A | 7/2000 | Ferraz et al. | |
| 6,131,580 A | 10/2000 | Ratner et al. | |
| 6,193,369 B1 | 2/2001 | Valint et al. | |
| 6,200,626 B1 | 3/2001 | Grobe et al. | |
| 6,213,604 B1 | 4/2001 | Valint et al. | |
| 6,312,393 B1 | 11/2001 | Abreu | |
| 6,348,507 B1 | 2/2002 | Heiler et al. | |
| 6,366,794 B1 | 4/2002 | Moussy et al. | |
| 6,423,001 B1 | 7/2002 | Abreu | |
| 6,428,839 B1 | 8/2002 | Kunzler et al. | |
| 6,431,705 B1 | 8/2002 | Linden | |
| 6,440,571 B1 | 8/2002 | Valint et al. | |
| 6,450,642 B1 | 9/2002 | Jethmalani et al. | |
| 6,532,298 B1 | 3/2003 | Cambier et al. | |
| 6,550,915 B1 | 4/2003 | Grobe, III | |
| 6,570,386 B2 | 5/2003 | Goldstein | |
| 6,579,235 B1 | 6/2003 | Abita et al. | |
| 6,599,559 B1 | 7/2003 | McGee et al. | |
| 6,614,408 B1 | 9/2003 | Mann | |
| 6,630,243 B2 | 10/2003 | Valint et al. | |
| 6,638,563 B2 | 10/2003 | McGee et al. | |
| 6,726,322 B2 | 4/2004 | Andino et al. | |
| 6,735,328 B1 | 5/2004 | Helbing et al. | |
| 6,779,888 B2 | 8/2004 | Marmo | |
| 6,804,560 B2 | 10/2004 | Nisch et al. | |
| 6,851,805 B2 | 2/2005 | Blum et al. | |
| 6,885,818 B2 | 4/2005 | Goldstein | |
| 6,939,299 B1 | 9/2005 | Petersen et al. | |
| 6,980,842 B2 | 12/2005 | March et al. | |
| 7,018,040 B2 | 3/2006 | Blum et al. | |
| 7,131,945 B2 | 11/2006 | Fink et al. | |
| 7,169,106 B2 | 1/2007 | Fleischman et al. | |
| 7,398,119 B2 | 7/2008 | Lambert et al. | |
| 7,423,801 B2 | 9/2008 | Kaufman et al. | |
| 7,429,465 B2 | 9/2008 | Muller et al. | |
| 7,441,892 B2 | 10/2008 | Hsu | |
| 7,443,016 B2 | 10/2008 | Tsai et al. | |
| 7,450,981 B2 | 11/2008 | Jeon | |
| 7,639,845 B2 | 12/2009 | Utsunomiya | |
| 7,654,671 B2 | 2/2010 | Glynn | |
| 7,699,465 B2 | 4/2010 | Dootjes et al. | |
| 7,728,949 B2 | 6/2010 | Clarke et al. | |
| 7,751,896 B2 | 7/2010 | Graf et al. | |
| 7,799,243 B2 | 9/2010 | Mather et al. | |
| 7,809,417 B2 | 10/2010 | Abreu | |
| 7,878,650 B2 | 2/2011 | Fritsch et al. | |
| 7,885,698 B2 | 2/2011 | Feldman | |
| 7,907,931 B2 | 3/2011 | Hartigan et al. | |
| 7,926,940 B2 | 4/2011 | Blum et al. | |
| 7,931,832 B2 | 4/2011 | Pugh et al. | |
| 7,964,390 B2 | 6/2011 | Rozakis et al. | |
| 8,080,187 B2 | 12/2011 | Tepedino, Jr. et al. | |
| 8,096,654 B2 | 1/2012 | Amirparviz et al. | |
| 8,118,752 B2 | 2/2012 | Hetling et al. | |
| 8,142,016 B2 | 3/2012 | Legerton et al. | |
| 8,197,539 B2 | 6/2012 | Nasiatka et al. | |
| 8,224,415 B2 | 7/2012 | Budiman | |
| 8,721,074 B2* | 5/2014 | Pugh | G02C 7/04 351/159.03 |
| 2002/0193674 A1 | 12/2002 | Fleischman et al. | |
| 2003/0179094 A1 | 9/2003 | Abreu | |
| 2004/0027536 A1 | 2/2004 | Blum et al. | |
| 2004/0116794 A1 | 6/2004 | Fink et al. | |
| 2005/0045589 A1 | 3/2005 | Rastogi et al. | |
| 2005/0221276 A1 | 10/2005 | Rozakis et al. | |
| 2007/0016074 A1 | 1/2007 | Abreu | |
| 2007/0030443 A1 | 2/2007 | Chapoy et al. | |
| 2007/0121065 A1 | 5/2007 | Cox et al. | |
| 2007/0188710 A1 | 8/2007 | Hetling et al. | |
| 2007/0191910 A1 | 8/2007 | Ren | |
| 2007/0270673 A1 | 11/2007 | Abrams et al. | |
| 2008/0037131 A1* | 2/2008 | Steenblik | B44F 1/10 359/619 |
| 2008/0086206 A1* | 4/2008 | Nasiatka | A61F 9/08 623/6.14 |
| 2008/0208335 A1 | 8/2008 | Blum et al. | |
| 2008/0218696 A1 | 9/2008 | Mir | |
| 2009/0033863 A1 | 2/2009 | Blum et al. | |
| 2009/0036761 A1 | 2/2009 | Abreu | |
| 2009/0057164 A1 | 3/2009 | Minick et al. | |
| 2009/0076367 A1 | 3/2009 | Sit et al. | |
| 2009/0118604 A1 | 5/2009 | Phan et al. | |
| 2009/0189830 A1 | 7/2009 | Deering et al. | |
| 2009/0189974 A1 | 7/2009 | Deering | |
| 2009/0196460 A1 | 8/2009 | Jakobs et al. | |
| 2010/0001926 A1 | 1/2010 | Amirparviz et al. | |
| 2010/0013114 A1 | 1/2010 | Bowers et al. | |
| 2010/0016704 A1 | 1/2010 | Naber et al. | |
| 2010/0028559 A1 | 2/2010 | Yan et al. | |
| 2010/0072643 A1 | 3/2010 | Pugh et al. | |
| 2010/0103368 A1* | 4/2010 | Amirparviz | B29D 11/00826 351/158 |
| 2010/0109175 A1 | 5/2010 | Pugh et al. | |
| 2010/0110372 A1 | 5/2010 | Pugh et al. | |
| 2010/0113901 A1 | 5/2010 | Zhang et al. | |
| 2010/0133510 A1 | 6/2010 | Kim et al. | |
| 2010/0249548 A1 | 9/2010 | Muller | |
| 2011/0015512 A1 | 1/2011 | Pan et al. | |
| 2011/0028807 A1 | 2/2011 | Abreu | |
| 2011/0040161 A1 | 2/2011 | Abreu | |
| 2011/0055317 A1 | 3/2011 | Vonog et al. | |
| 2011/0063568 A1 | 3/2011 | Meng et al. | |
| 2011/0084834 A1 | 4/2011 | Sabeta | |
| 2011/0116035 A1 | 5/2011 | Fritsch et al. | |
| 2011/0157541 A1 | 6/2011 | Peyman | |
| 2011/0157544 A1 | 6/2011 | Pugh et al. | |
| 2011/0184271 A1 | 7/2011 | Veciana et al. | |
| 2011/0274680 A1 | 11/2011 | Mazed et al. | |
| 2011/0286064 A1 | 11/2011 | Burles et al. | |
| 2011/0298794 A1 | 12/2011 | Freedman | |
| 2012/0026458 A1 | 2/2012 | Qiu et al. | |
| 2012/0038881 A1 | 2/2012 | Amirparviz et al. | |
| 2012/0041287 A1 | 2/2012 | Goodall et al. | |
| 2012/0041552 A1 | 2/2012 | Chuck et al. | |
| 2012/0069254 A1 | 3/2012 | Burton | |
| 2012/0075168 A1 | 3/2012 | Osterhout et al. | |
| 2012/0075574 A1 | 3/2012 | Pugh et al. | |

(56) References Cited

U.S. PATENT DOCUMENTS

| | | | |
|---|---|---|---|
| 2012/0078071 A1 | 3/2012 | Bohm et al. | |
| 2012/0088258 A1 | 4/2012 | Bishop et al. | |
| 2012/0092612 A1 | 4/2012 | Binder et al. | |
| 2012/0109296 A1 | 5/2012 | Fan | |
| 2012/0177576 A1 | 7/2012 | Hu | |
| 2012/0201755 A1 | 8/2012 | Rozakis et al. | |
| 2012/0245444 A1 | 9/2012 | Otis et al. | |
| 2012/0259188 A1 | 10/2012 | Besling | |
| 2013/0037700 A1* | 2/2013 | Michiyama | G01J 1/0266 250/208.2 |

FOREIGN PATENT DOCUMENTS

| | | | |
|---|---|---|---|
| EP | 1061874 | 12/2000 | |
| EP | 1818008 | 8/2007 | |
| EP | 1947501 | 7/2008 | |
| EP | 1617757 | 8/2009 | |
| EP | 2457122 | 5/2012 | |
| WO | 1995/004609 | 2/1995 | |
| WO | 2001/016641 | 3/2001 | |
| WO | 2001/034312 | 5/2001 | |
| WO | 2003/065876 | 8/2003 | |
| WO | 2004/060431 | 7/2004 | |
| WO | 2004/064629 | 8/2004 | |
| WO | 2006/015315 | 2/2006 | |
| WO | WO 2006015315 A2 * | 2/2006 | A61F 9/08 |
| WO | 2009/094643 | 7/2009 | |
| WO | 2010/105728 | 9/2010 | |
| WO | 2010/133317 | 11/2010 | |
| WO | 2011/011344 | 1/2011 | |
| WO | 2011/034592 | 3/2011 | |
| WO | 2011/035228 | 3/2011 | |
| WO | 2011/035262 | 3/2011 | |
| WO | 2011/083105 | 7/2011 | |
| WO | 2011/163080 | 12/2011 | |
| WO | 2012/035429 | 3/2012 | |
| WO | 2012/037455 | 3/2012 | |
| WO | 2012/051167 | 4/2012 | |
| WO | 2012/051223 | 4/2012 | |
| WO | 2012052765 | 4/2012 | |

OTHER PUBLICATIONS

Bilihar, D. (n.d.). What Is a Pinhole Camera? Retrieved from Pinhole.cz: http://www.pinhold.cz/en/pinholecameras/whatis.html.*

Wang et al., A Light-Field Image Sensor in 180 nm CMOS, IEEE Journal of Solid-State Circuits, vol. 47, No. 1, Jan. 2012.

Fife et al., "A Multi-Aperture Image Sensor With 0.7 μm Pixels in 0.11 μm CMOS Technology", IEEE Journal of Solid-State Circuits, vol. 43, No. 12, Dec. 2008.

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.

Chu et al., "Biomedical soft contact-lens sensor for in situ ocular biomonitoring of tear contents," Biomed Microdevices, 2011, pp. 603-611, vol. 13.

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-μW Bandgap-Referenced Output Controller," IEEE Transactions on Circuits and Systems—II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 μA, Addressable Gen2 Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Bionic contact lens 'to project emails before eyes,' http://www.kurzweilai.netforums/topic/bionic-contact-lens-to-project-emails-before-eyes, Last accessed Mar. 14, 2012, 2 pages.

Brahim, et al., "Polypyrrole-hydrogel composites for the construction of clinically important biosensors," 2002, Biosensors & Bioelectronics, pp. 53-59, vol. 17.

Chen, et al., "Microfabricated Implantable Parylene-Based Wireless Passive Intraocular Pressure Sensors," Journal of Microelectromechanical Systems, Dec. 2008, pp. 1342-1351, vol. 17, No. 6.

Chu, et al., "Soft Contact-lens Sensor for Monitoring Tear Sugar as Novel Wearable Device of Body Sensor Network," http://www.ksi edu/seke/dms11/DMS/2_Kohji_Mitsubayashi.pdf, Last accessed Jul. 27, 2012, 4 pages.

"Contact Lenses: Look Into My Eyes," The Economist, Jun. 2, 2011 , http://www.economist.com/node/18750624/print, Last accessed Mar. 13, 2012, 8 pages.

Haders, "New Controlled Release Technologies Broaden Opportunities for Ophthalmic Therapies," Drug Delivery Technology, Jul./Aug. 2009, pp. 48-53, vol. 8, No. 7.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Huang, et al., "Wrinkling of Ultrathin Polymer Films," Mater. Res. Soc. Symp. Proc., 2006, 6 pages, vol. 924, Materials Research Society.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Liao, et al., "A 3-μW CMOS Glucose Sensor for Wireless Contact-Lens Tear Glucose Monitoring ,"IEEE Journal of Solid-State Circuits, Jan. 2012, pp. 335-344, vol. 47, No. 1.

(56) References Cited

OTHER PUBLICATIONS

Liao, et al., "A 3-µW Wirelessly Powered CMOS Glucose Sensor for an Active Contact Lens," 2011 IEEE International Solid-State Circuits Conference, Session 2, Feb. 21, 2011, 3 pages.

Lingley, et al., "A Single-Pixel Wireless Contact Lens Display," Journal of Micromechanics and Microengineering, 2011, pp. 1-8.

Lingley, et al., "Multipurpose integrated active contact lenses," SPIE, 2009, 2 pages.

Liu, et al., "Miniature Amperometric Self-Powered Continuous Glucose Sensor with Linear Response," Analytical Chemistry, 2012, 7 pages.

Loncar, et al., "Design and Fabrication of Silicon Photonic Crystal Optical Waveguides," Journal of Lightwave Technology, Oct. 2000, pp. 1402-1411, vol. 18, No. 10.

Murdan, "Electro-responsive drug delivery from hydrogels," Journal of Controlled Release, 2003, pp. 1-17, vol. 92.

Pandey, et al., "A Fully Integrated RF-Powered Contact Lens With a Single Element Display," IEEE Transactions on Biomedical Circuits and Systems, Dec. 2010, pp. 454-461, vol. 4, No. 6.

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Selner, et al., "Novel Contact Lens Electrode Array for Multi-electrode Electroretinography (meERG)," IEEE, 2011, 2 pages.

Singh, et al., "Novel Approaches in Formulation and Drug Delivery using Contact Lenses," Journal of Basic and Clinical Pharmacy, May 2011, pp. 87-101, vol. 2, Issue 2.

Thomas, et al., "Functional Contact Lenses for Remote Health Monitoring in Developing Countries," IEEE Global Humanitarian Technology Conference, 2011, pp. 212-217, IEEE Computer Society.

Tweedie, et al., "Contact creep compliance of viscoelastic materials via nanoindentation," J. Mater. Res., Jun. 2006, pp. 1576-1589, vol. 21, No. 2, Materials Research Society.

Wall, K., "Active contact lens that lets you see like the Terminator patented," Feb. 10, 2012, http://vvww.patexia.com/feed/active-contact-lens-that-lets-you-see-like-the-terminator-patented-2407, Last accessed Mar. 28, 2012, 5 pages.

Zarbin, et al., "Nanotechnology in ophthalmology," Can J Ophthalmol, 2010, pp. 457-476, vol. 45, No. 5.

\* cited by examiner

FULLY INTEGRATED PINHOLE CAMERA FOR EYE-MOUNTABLE IMAGING SYSTEM

BACKGROUND

Unless otherwise indicated herein, the materials described in this section are not prior art to the claims in this application and are not admitted to be prior art by inclusion in this section.

An electronic image sensor can be formed of a pixelated array of photo-sensitive elements. The photo-sensitive elements can operate to detect incoming light via photodiodes in each element, which can be implemented in a silicon plane. Read out circuitry can be constructed from one or more thin film transistors (TFTs) associated with each photo-sensitive element. For example, a voltage corresponding to the light incident on the photodiode can be read out for each photo-sensitive element in the array. The resulting data from the pixelated array can then be used to determine a digital image representing the incoming light. Such an image sensor can be implemented using semiconductor assembly technologies, such as complementary metal-oxide-semiconductor (CMOS) technology. Such a CMOS array can be fabricated on a silicon wafer using patterned photodiodes and TFTs to provide a voltage output corresponding to the incident light. The voltage output can then be converted to a digital value and further analyzed/stored. Combining the digital values corresponding to incident light across an array of such CMOS sensors results in a digital representation of an image.

The semiconductor region of photodiodes is thus the photo-sensitive layer of an electronic image sensor. To focus incident light on the photo-sensitive layer, a primary lens typically focuses light passing through an aperture on a focal plane coincident with the photo-sensitive layer of the image sensor. The distance from the aperture to the focal plane is the focal length. The ratio between the focal length and the aperture diameter is the focal ratio or f-stop. Typical electronic image sensors include primary lenses with a thickness of at least several millimeters and also have a typical focal length of several millimeters. As a result, electronic image sensors generally have a form factor between the primary aperture lens and photo-sensitive layer of at least roughly 10 millimeters.

SUMMARY

An ophthalmic electronics platform can include an eye-mountable camera. The ophthalmic device can include a polymeric material configured to mount to a corneal surface of an eye. An image sensor, control electronics, and an antenna can be situated on a substrate embedded in the polymeric material. The control electronics can operate the image sensor to capture an image and can operate the antenna to wirelessly communicate the readings from the image sensor to an external reader via the antenna. The image sensor includes a sensor array including multiple photo-sensitive elements configured to measure light reaching the sensor array after passing through a non-focusing aperture. The position of each photo-sensitive element with respect to the non-focusing aperture causes the light measured by each photo-sensitive element to be substantially from only one direction. The direction-specific measurements of received light from across the sensor array can thereby be used to form an image.

Some embodiments of the present disclosure provide an eye-mountable device including a transparent polymeric material, a substrate, and an image sensor. The transparent polymeric material can have a concave surface and a convex surface. The concave surface can be configured to be removably mounted over a corneal surface and the convex surface can be configured to be compatible with eyelid motion when the concave surface is so mounted. The substrate can be at least partially embedded in the transparent polymeric material. The image sensor can be disposed on the substrate. The image sensor can include an opaque screen including a non-focusing aperture, and a photo-sensitive area occupied by a plurality of photo-sensitive elements. The non-focusing aperture can be smaller than the photo-sensitive area, and each of the photo-sensitive elements can be configured to receive light entering the non-focusing aperture from a respective direction.

Some embodiments of the present disclosure provide a method. The method can include transmitting an interrogation signal to an eye-mountable device comprising an image sensor including a photo-sensitive area configured to receive light entering a non-focusing aperture in an opaque screen, and an antenna. The interrogation signal can be configured to cause the image sensor to measure light received by a plurality of photo-sensitive elements occupying the photo-sensitive area. The method can include receiving, from the eye-mountable device, an indication of the measured light measured by the plurality of photo-sensitive elements. The method can include determining an image based on the received indication.

Some embodiments of the present disclosure include a non-transitory computer readable medium storing instructions that, when executed by one or more processors in a computing device, cause the computing device to perform operations. The operations can include transmitting an interrogation signal to an eye-mountable device comprising an image sensor including a photo-sensitive area configured to receive light entering a non-focusing aperture in an opaque screen, and an antenna. The interrogation signal can be configured to cause the image sensor to obtain an image by measuring light received by a plurality of photo-sensitive elements occupying the photo-sensitive area. The operations can include receiving, from the eye-mountable device, an indication of the measured light measured by the plurality of photo-sensitive elements. The operations can include determining an image based on the received indication.

Some embodiments of the present disclosure include a system. The system can include means for transmitting an interrogation signal to an eye-mountable device comprising an image sensor including a photo-sensitive area configured to receive light entering a non-focusing aperture in an opaque screen, and an antenna. The interrogation signal can be configured to cause the image sensor to obtain an image by measuring light received by a plurality of photo-sensitive elements occupying the photo-sensitive area. The system can include means for receiving, from the eye-mountable device, an indication of the measured light measured by the plurality of photo-sensitive elements. The system can include means for determining an image based on the received indication.

Some embodiments of the present disclosure include an eye-mountable system. The system can include means for measuring received light that enters a non-focusing aperture at multiple locations across a sensor array. The system can include means for associating directions of the received light based on the locations on the sensor array with respect to the non-focusing aperture. The system can include means for determining an image of the surrounding environment based on the measurements of received light and the associated directions.

These as well as other aspects, advantages, and alternatives, will become apparent to those of ordinary skill in the art by reading the following detailed description, with reference where appropriate to the accompanying drawings.

DETAILED DESCRIPTION

Figure 1:
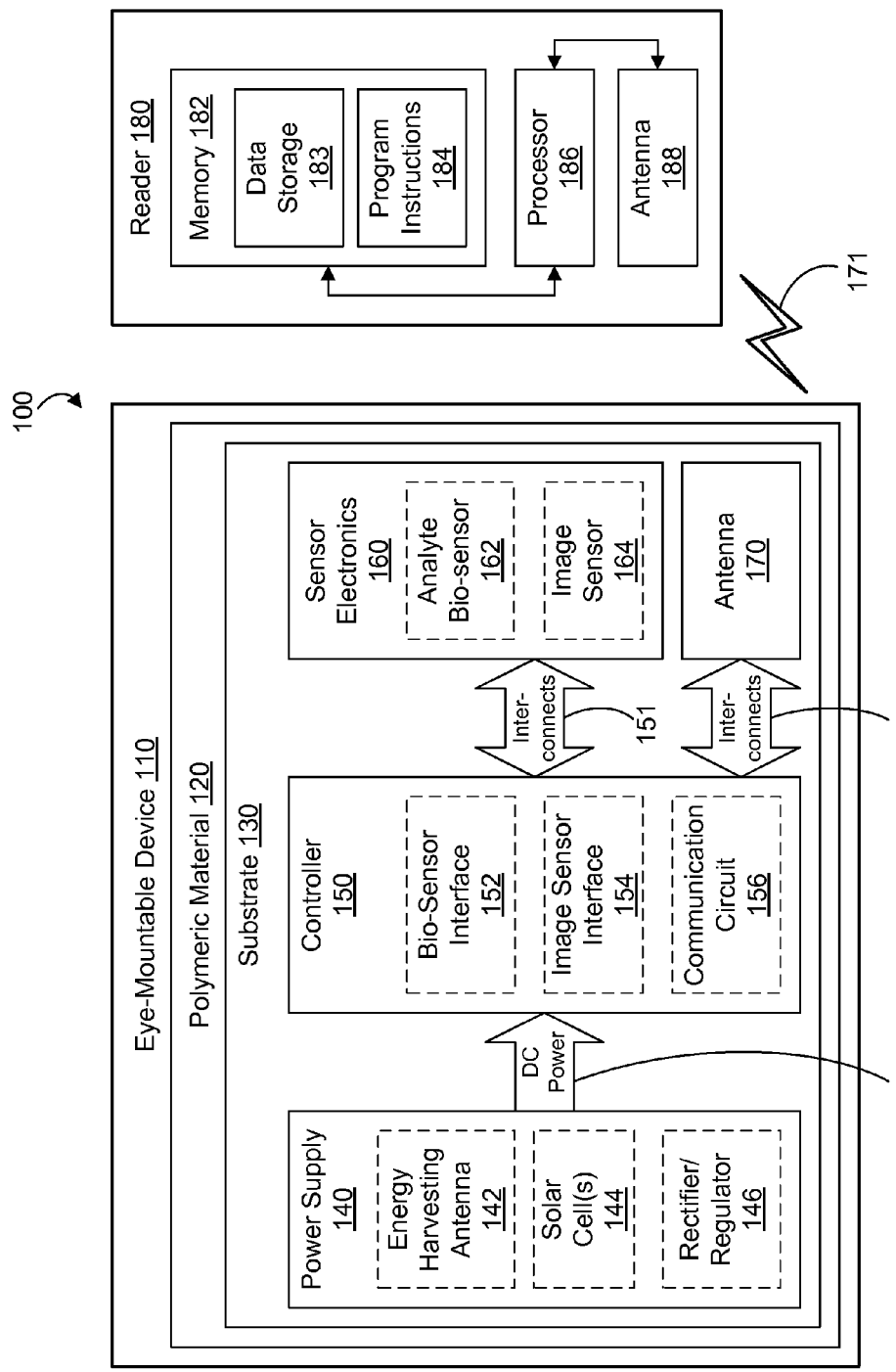
FIG. 1 is a block diagram of an example system that includes an eye-mountable device in wireless communication with an external reader.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An ophthalmic electronics platform can include an eye-mountable camera. The ophthalmic device can include a polymeric material configured to mount to a corneal surface of an eye. An image sensor, control electronics, and an antenna can be situated on a substrate embedded in the polymeric material. The control electronics can operate the image sensor to capture an image and can operate the antenna to wirelessly communicate the readings from the image sensor to an external reader via the antenna. The image sensor includes a sensor array including multiple photo-sensitive elements configured to measure light reaching the sensor array after passing through a non-focusing aperture. The position of each photo-sensitive element with respect to the non-focusing aperture causes the light measured by each photo-sensitive element to be substantially from only one direction. The direction-specific measurements of received light from across the sensor array can thereby be used to form an image.

In some examples, the polymeric material can be in the form of a round lens with a concave curvature configured to mount to a corneal surface of an eye. The substrate can be embedded near the periphery of the polymeric material to avoid interference with incident light received closer to the central region of the cornea. The image sensor can be arranged on the substrate to face inward, toward the corneal surface, so as to generate images of the eye. Additionally or alternatively, the sensor can be arranged on the substrate to face outward, away from the corneal surface so as to capture images of the surrounding environment.

The ophthalmic electronics platform can receive power from radiated energy harvested at the eye-mountable device. Power can be generated from incident light energizing photovoltaic cells. Additionally or alternatively, power can be generated from incident radio frequency radiation inductively harvested using the antenna. A rectifier and/or regulator can be incorporated with the control electronics to generate a stable DC voltage to power the electronics from the harvested energy. The antenna can be arranged as a loop of conductive material with leads connected to the control electronics. In some embodiments, such a loop antenna can also wirelessly communicate the sensor readings to an external reader by modifying the impedance of the loop antenna so as to modify backscatter radiation from the antenna.

The image sensor can be implemented as an array of complementary metal oxide semiconductor (CMOS) devices disposed on a silicon wafer. An opaque screen including a non-focusing aperture blocks light from reaching the image sensor except for light passing through the aperture. The screen can be situated in a plane at least approximately parallel to a plane of the image sensor, and the aperture can be located near the center of the screen. That is, the aperture may be located at a position close to the center point of the image sensor, projected normally outward from the plane of the image sensor to intersect the opaque screen. The aperture in the screen thereby creates a source of light to illuminate the image sensor array, and photo-sensitive elements at different locations receive light entering the aperture from different directions.

The aperture in the opaque aperture causes each photo-sensitive element ("pixel") in the image sensor array to receive light from a respective, spatially distinct region of the surrounding environment or of the eye, similar to a lens configured to focus incident light across a broad area at an imaging plane. The image sensor can thereby capture an image of the scene or the eye without using a lens, by distinguishing spatially distinct image information from light passing through a single aperture. In comparison to an image capture camera system using a primary lens to focus light onto a focal plane including the image sensor array, the non-focusing aperture based image sensor system can be more compact and therefore more suitable to small form factor applications, such as ophthalmic electronics platforms. A typical focusing lens for an image capture system may have a thickness on the order of one or more millimeters, and then may have a focal length on the order of one or more millimeters. The minimum thickness of such a system is therefore typically several millimeters. By contrast, the non-focusing apertures employed herein are typically only as thick as the opaque screen, which could be in the range of hundreds of Angstroms to a few micrometers. The distance from the aperture to the sensor array can be in the range of ten micrometers to about 100 micrometers. The fully assembled image sensor system can then have thickness of around 100 micrometers and can be suitable for being incorporated into an eye-mountable device, which may have a polymeric material with total thickness of about 200 micrometers, for example.

In one example, the image sensor array can be a 20 by 20 CMOS sensor array, with pixels (photo-sensitive elements) approximately 2 micrometers in diameter. An opaque metal layer can be situated over the CMOS array, at a separation distance of about 10 micrometers (thereby defining the focal length of the imaging system at 10 micrometers). An aperture near the center of the metal layer can have a diameter of a few micrometers (e.g., about 3 micrometers) and allows light entering the aperture to be received at the image sensor array. Each pixel in the array can then operate to detect light reaching each individual pixel. An image can then be determined by combining the measurements of received light in accordance with the directions associated with each pixel in the sensor array. For example, the image sensor array can integrate light measurements over a predetermined exposure interval and read out the resulting set of values across the array (e.g., based on charge accumulated on a photodiode in each CMOS device). Other dimensions of the relative spacing between image sensor array and opaque layer, aperture dimensions, pixel dimensions, and CMOS array size can also be used.

An image sensor integrated within an eye-mountable device can be situated to capture images of a scene to which the wearer of the eye-mountable device is exposed. In such an example, the image sensor can be situated within the polymeric material of the eye-mountable device so as to detect light incident on the eye. Thus, the screen with aperture can be positioned between the outward-facing surface of the polymeric material and the image sensor, such that light from the surrounding environment passes through the aperture to the image sensor array. Alternatively, the image sensor can be situated to detect light from the eye itself by positioning the screen with aperture between the eye-facing surface of the polymeric material and the image sensor, such that light reflected from the eye passes through the aperture to the image sensor array. Such eye-imaging applications may be used, at least in part, to obtain biometric indications for verifying a user's identity, such as based on images of the iris, etc.

In some embodiments, the image sensor array can have pixels with non-uniform sizes. In particular, the light-sensitive portions of the pixels in the array (e.g., a photodiode) can be larger in regions near the periphery of the array, than near the center. The larger light-sensitive area of the peripheral pixels can at least partially compensate for relatively lower flux reaching those portions of the image sensor array (e.g., from increasingly obtuse incident angles and/or from shadowing effects by the inner lip of the aperture, etc.). Additionally or alternatively, the image sensor electronics can be configured to compensate/calibrate for profiles of light reception across the image sensor array.

In some embodiments, an image sensor system can include multiple non-focusing apertures. The multiple apertures may each illuminate non-overlapping, distinct image sensor arrays, and the resulting pattern of light measurements on the multiple sensor arrays can then be combined to form an image. Such parallel image sensors can increase the sensitivity of the image sensor over all by increasing the light gathering area. Additionally or alternatively, multiple apertures may illuminate a single sensor array, and post-processing routines can be employed to associate one or more direction(s) of light with each photo-sensitive element in the array so as to account for potentially overlapping illumination patterns.

II. Example Ophthalmic Electronics Platform

FIG. 1 is a block diagram of a system 100 that includes an eye-mountable device 110 in wireless communication with an external reader 180. The exposed regions of the eye-mountable device 110 are made of a polymeric material 120 formed to be contact-mounted to a corneal surface of an eye. A substrate 130 is embedded in the polymeric material 120 to provide a mounting surface for a power supply 140, a controller 150, sensor electronics 160, and a communication antenna 170. The sensor electronics 160 are operated by the controller 150. The power supply 140 supplies operating voltages to the controller 150 and/or the sensor electronics 160. The antenna 170 is operated by the controller 150 to communicate information to and/or from the eye-mountable device 110. The antenna 170, the controller 150, the power supply 140, and the sensor electronics 160 can all be situated on the embedded substrate 130. Because the eye-mountable device 110 includes electronics and is configured to be contact-mounted to an eye, it is also referred to herein as an ophthalmic electronics platform.

To facilitate contact-mounting, the polymeric material 120 can have a concave surface configured to adhere ("mount") to a moistened corneal surface (e.g., by capillary forces with a tear film coating the corneal surface). Additionally or alternatively, the eye-mountable device 110 can be adhered by a vacuum force between the corneal surface and the polymeric material due to the concave curvature. While mounted with the concave surface against the eye, the outward-facing surface of the polymeric material 120 can have a convex curvature that is formed to not interfere with eye-lid motion while the eye-mountable device 110 is mounted to the eye. For example, the polymeric material 120 can be a substantially transparent curved polymeric disk shaped similarly to a vision correction contact lens.

The polymeric material 120 can include one or more biocompatible materials, such as those employed for use in contact lenses or other ophthalmic applications involving direct contact with the corneal surface. The polymeric material 120 can optionally be formed in part from such biocompatible materials or can include an outer coating with such biocompatible materials. The polymeric material 120 can include materials configured to moisturize the corneal surface, such as hydrogels and the like. In some embodiments, the polymeric material 120 can be a deformable ("non-rigid") material to enhance wearer comfort. In some embodiments, the polymeric material 120 can be shaped to provide a predetermined, vision-correcting optical power, such as can be provided by a contact lens.

The substrate 130 includes one or more surfaces suitable for mounting the sensor electronics 160, the controller 150, the power supply 140, and the antenna 170. The substrate 130 can be employed both as a mounting platform for chip-based circuitry (e.g., by flip-chip mounting to connection pads) and/or as a platform for patterning conductive materials (e.g., gold, platinum, palladium, titanium, copper, aluminum, silver, metals, other conductive materials, combinations of these, etc.) to create electrodes, interconnects, connection pads, antennae, etc. In some embodiments, substantially transparent conductive materials (e.g., indium tin oxide) can be patterned on the substrate 130 to form circuitry, electrodes, etc. For example, the antenna 170 can be formed by forming a pattern of gold or another conductive material on the substrate 130 by deposition, photolithography, electroplating, etc. Similarly, interconnects 151, 157 between the controller 150 and the sensor electronics 160, and between the controller 150 and the antenna 170, respectively, can be formed by depositing suitable patterns of conductive materials on the substrate 130. A combination of microfabrication techniques including, without limitation, the use of photoresists, masks, deposition techniques, and/or plating techniques can be employed to pattern materials on the substrate 130. The substrate 130 can be a relatively rigid material, such as polyethylene terephthalate ("PET"), parylene, or another material configured to structurally support the circuitry and/or chip-based electronics within the polymeric material 120. The eye-mountable device 110 can alternatively be arranged with a group of unconnected substrates rather than a single substrate. For example, the controller 150 and a sensor in sensor electronics 160 can be mounted to one substrate, while the antenna 170 is mounted to another substrate and the two can be electrically connected via the interconnects 157.

In some embodiments, the sensor electronics 160 (and the substrate 130) can be positioned away from the center of the eye-mountable device 110 and thereby avoid interference with light transmission to the central, light-sensitive region of the eye. For example, where the eye-mountable device 110 is shaped as a concave-curved disk, the substrate 130 can be embedded around the periphery (e.g., near the outer circumference) of the disk. In some embodiments, however, the sensor electronics 160 (and the substrate 130) can be positioned in or near the central region of the eye-mountable device 110.

The substrate 130 can be shaped as a flattened ring with a radial width dimension sufficient to provide a mounting platform for the embedded electronics components. The substrate 130 can have a thickness sufficiently small to allow the substrate 130 to be embedded in the polymeric material 120 without influencing the profile of the eye-mountable device 110. The substrate 130 can have a thickness sufficiently large to provide structural stability suitable for supporting the electronics mounted thereon. For example, the substrate 130 can be shaped as a ring with a diameter of about 10 millimeters, a radial width of about 1 millimeter (e.g., an outer radius 1 millimeter larger than an inner radius), and a thickness of about 50 micrometers. The substrate 130 can optionally be aligned with the curvature of the eye-mounting surface of the eye-mountable device 110 (e.g., convex surface). For example, the substrate 130 can be shaped along the surface of an imaginary cone between two circular segments that define an inner radius and an outer radius. In such an example, the surface of the substrate 130 along the surface of the imaginary cone defines an inclined surface that is approximately aligned with the curvature of the eye mounting surface at that radius.

The power supply 140 is configured to harvest ambient energy to power the controller 150 and sensor electronics 160. For example, a radio-frequency energy-harvesting antenna 142 can capture energy from incident radio radiation. Additionally or alternatively, solar cell(s) 144 ("photovoltaic cells") can capture energy from incoming ultraviolet, visible, and/or infrared radiation. Furthermore, an inertial power scavenging system can be included to capture energy from ambient vibrations. The energy harvesting antenna 142 can optionally be a dual-purpose antenna that is also used to communicate information to the external reader 180. That is, the functions of the communication antenna 170 and the energy harvesting antenna 142 can be accomplished with the same physical antenna.

A rectifier/regulator 146 can be used to condition the captured energy to a stable DC supply voltage 141 that is supplied to the controller 150. For example, the energy harvesting antenna 142 can receive incident radio frequency radiation. Varying electrical signals on the leads of the antenna 142 are output to the rectifier/regulator 146. The rectifier/regulator 146 rectifies the varying electrical signals to a DC voltage and regulates the rectified DC voltage to a level suitable for operating the controller 150. Additionally or alternatively, output voltage from the solar cell(s) 144 can be regulated to a level suitable for operating the controller 150. The rectifier/regulator 146 can include one or more energy storage devices to mitigate high frequency variations in the ambient energy gathering antenna 142 and/or solar cell(s) 144. For example, one or more energy storage devices (e.g., a capacitor, a battery, etc.) can be connected in parallel across the outputs of the rectifier 146 to regulate the DC supply voltage 141 and configured to function as a low-pass filter.

The controller 150 is turned on when the DC supply voltage 141 is provided to the controller 150, and the logic in the controller 150 operates the sensor electronics 160 and the antenna 170. The controller 150 can include logic circuitry configured to operate the sensor electronics 160 so as to sense an environment of the eye-mountable device 110. For example, the sensor electronics 160 may include an analyte bio-sensor 162 configured to sense an analyte in the biological environment (e.g., tear film) of the eye-mountable device 110. Additionally or alternatively, the sensor electronics 160 could include an image sensor 164 that is configured to image an environment of the eye-mountable device 110 (e.g., an external environment outside of the eye or an internal environment within the eye).

In one example, the controller 150 includes a bio-sensor interface module 152 that is configured to operate analyte bio-sensor 162. The analyte bio-sensor 162 can be, for example, an amperometric electrochemical sensor that includes a working electrode and a reference electrode. A voltage can be applied between the working and reference electrodes to cause an analyte to undergo an electrochemical reaction (e.g., a reduction and/or oxidation reaction) at the working electrode. The electrochemical reaction can generate an amperometric current that can be measured through the working electrode. The amperometric current can be dependent on the analyte concentration. Thus, the amount of the amperometric current that is measured through the working electrode can provide an indication of analyte concentration. In some embodiments, the bio-sensor interface module 152 can be a potentiostat configured to apply a voltage difference between working and reference electrodes while measuring a current through the working electrode.

In some instances, a reagent can also be included to sensitize the electrochemical sensor to one or more desired analytes. For example, a layer of glucose oxidase ("GOx") proximal to the working electrode can catalyze glucose oxidation to generate hydrogen peroxide ($H_2O_2$). The hydrogen peroxide can then be electro-oxidized at the working electrode, which releases electrons to the working electrode, resulting in an amperometric current that can be measured through the working electrode.

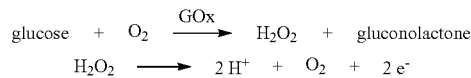

The current generated by either reduction or oxidation reactions is approximately proportionate to the reaction rate. Further, the reaction rate is dependent on the rate of analyte molecules reaching the electrochemical sensor electrodes to fuel the reduction or oxidation reactions, either directly or catalytically through a reagent. In a steady state, where analyte molecules diffuse to the electrochemical sensor electrodes from a sampled region at approximately the same rate that additional analyte molecules diffuse to the sampled region from surrounding regions, the reaction rate is approximately proportional to the concentration of the analyte molecules. The current measured through the working electrode thus provides an indication of the analyte concentration.

The controller 150 can include an image sensor interface 154 for operating image sensor 164. The image sensor 164 can include a photo-sensitive area populated by a plurality of photo-sensitive elements. An opaque screen including a non-focusing aperture can be positioned such that light entering the aperture is received by the photo-sensitive elements. The photo-sensitive elements thus receive light from different directions depending on their location with respect to the aperture. Each photo-sensitive element can be implemented as a complementary metal oxide semiconductor (CMOS) device, such as a device including a photodiode and one or more TFTs arranged in a circuit to facilitate reading values from the photodiode and/or resetting the photodiode (e.g., between subsequent image capture events). The measurements of light received at the various photo-sensitive elements across the image sensor 164 can then be associated with light from a particular direction, and the light measurements can be combined to form an image of the received light.

Thus, the image sensor 164 can be an array of separately programmable light receiving devices ("pixels") arranged in rows and columns. Each photo-sensitive element (e.g., photodiode) can be operated by individual pixel circuits to effect read out and/or reset operations according to information from the image sensor interface 154. Such an image sensor 164 can also optionally include filters over some of the photo-sensitive elements (e.g., red, green, and blue pixels) to capture color content information of received light. However, monochrome image sensors may also be employed. The image sensor interface 154 can include, for example, one or more data lines for providing read out data (e.g., voltage values) from the separately programmed photo-sensitive elements in the array of the image sensor 164 and one or more addressing lines for setting groups of photo-sensitive elements (e.g., rows or columns) to discharge following read out and prepare for a subsequent image capture.

The controller 150 can also include a communication circuit 156 for sending and/or receiving information via the antenna 170. The communication circuit 156 can optionally include one or more oscillators, mixers, frequency injectors, etc. to modulate and/or demodulate information on a carrier frequency to be transmitted and/or received by the antenna 170. In some examples, the eye-mountable device 110 is configured to indicate an output from a bio-sensor by modulating an impedance of the antenna 170 in a manner that is perceivable by the external reader 180. For example, the communication circuit 156 can cause variations in the amplitude, phase, and/or frequency of backscatter radiation from the antenna 170, and such variations can be detected by the reader 180.

The controller 150 is connected to the sensor electronics 160 via interconnects 151. For example, where the controller 150 includes logic elements implemented in an integrated circuit to form the bio-sensor interface module 152 and/or image sensor interface 154, a patterned conductive material (e.g., gold, platinum, palladium, titanium, copper, aluminum, silver, metals, combinations of these, etc.) can connect a terminal on the chip to the sensor electronics 160. Similarly, the controller 150 is connected to the antenna 170 via interconnects 157.

It is noted that the block diagram shown in FIG. 1 is described in connection with functional modules for convenience in description. However, embodiments of the eye-mountable device 110 can be arranged with one or more of the functional modules ("sub-systems") implemented in a single chip, integrated circuit, and/or physical component. For example, while the rectifier/regulator 146 is illustrated in the power supply block 140, the rectifier/regulator 146 can be implemented in a chip that also includes the logic elements of the controller 150 and/or other features of the embedded electronics in the eye-mountable device 110. Thus, the DC supply voltage 141 that is provided to the controller 150 from the power supply 140 can be a supply voltage that is provided to components on a chip by rectifier and/or regulator components located on the same chip. That is, the functional blocks in FIG. 1 shown as the power supply block 140 and controller block 150 need not be implemented as physically separated modules. Moreover, one or more of the functional modules described in FIG. 1 can be implemented by separately packaged chips electrically connected to one another.

Additionally or alternatively, the energy harvesting antenna 142 and the communication antenna 170 can be implemented with the same physical antenna. For example, a loop antenna can both harvest incident radiation for power generation and communicate information via backscatter radiation.

The external reader 180 includes an antenna 188 (or a group of multiple antennas) to send and receive wireless signals 171 to and from the eye-mountable device 110. The external reader 180 also includes a computing system with a processor 186 in communication with a memory 182. The memory 182 is a non-transitory computer-readable medium that can include, without limitation, magnetic disks, optical disks, organic memory, and/or any other volatile (e.g. RAM) or non-volatile (e.g. ROM) storage system readable by the processor 186. The memory 182 can include a data storage 183 to store indications of data, such as sensor readings (e.g., from the analyte bio-sensor 162 and/or image sensor 164), program settings (e.g., to adjust behavior of the eye-mountable device 110 and/or external reader 180), etc. The memory 182 can also include program instructions 184 for execution by the processor 186 to cause the external reader 180 to perform processes specified by the instructions 184. For example, the program instructions 184 can cause external reader 180 to provide a user interface that allows for retrieving information communicated from the eye-mountable device 110 (e.g., sensor outputs from the analyte bio-sensor 162). The external reader 180 can also include one or more hardware components for operating the antenna 188 to send and receive the wireless signals 171 to and from the eye-mountable device 110. For example, oscillators, frequency injectors, encoders, decoders, amplifiers, filters, etc. can drive the antenna 188 according to instructions from the processor 186.

The external reader 180 can be a smart phone, digital assistant, or other portable computing device with wireless connectivity sufficient to provide the wireless communication link 171. The external reader 180 can also be implemented as an antenna module that can be plugged in to a portable computing device, such as in an example where the communication link 171 operates at carrier frequencies not commonly employed in portable computing devices. In some instances, the external reader 180 is a special-purpose device configured to be worn relatively near a wearer's eye to allow the wireless communication link 171 to operate with a low power budget. For example, the external reader 180 can be integrated in a piece of jewelry such as a necklace, earing, etc. or integrated in an article of clothing worn near the head, such as a hat, headband, a pair of eyeglasses, etc.

In some embodiments, the system 100 can operate to non-continuously ("intermittently") supply energy to the eye-mountable device 110 to power the controller 150 and sensor electronics 160. For example, radio frequency radiation 171 can be supplied to power the eye-mountable device 110 long enough to operate the sensor electronics 160 and communicate an outcome of such operation. In such an example, the supplied radio frequency radiation 171 can be considered an interrogation signal from the external reader 180 to the eye-mountable device 110 to request feedback (e.g., a measurement result, etc.). By periodically interrogating the eye-mountable device 110 (e.g., by supplying radio frequency radiation 171 to temporarily turn the device on), the external reader 180 can accumulate a set of measurements (or other feedback) over time from the sensor electronics 160 without continuously powering the eye-mountable device 110.

Figure 2A:
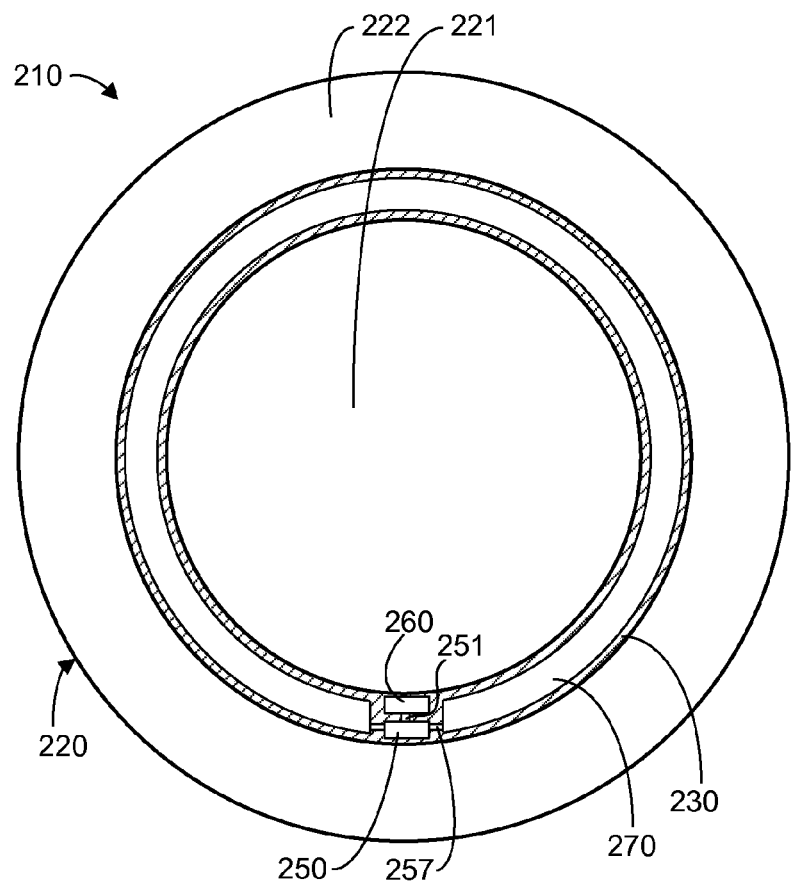
FIG. 2A is a bottom view of an example eye-mountable device.
Figure 2B:
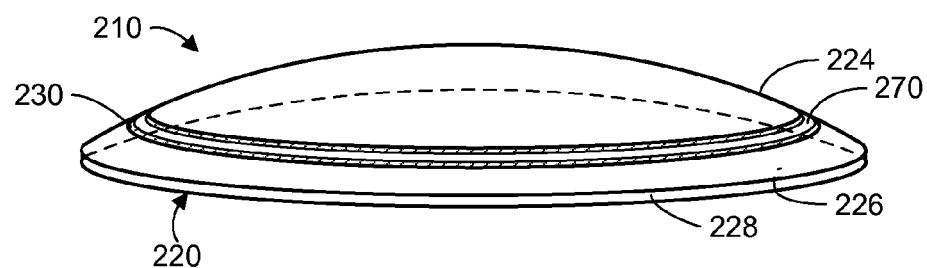
FIG. 2B is a side view of the example eye-mountable device shown in FIG. 2A.

FIG. 2A is a top view of an example eye-mountable electronic device 210 (or ophthalmic electronics platform). FIG. 2B is an aspect view of the example eye-mountable electronic device shown in FIG. 2A. It is noted that relative dimensions in FIGS. 2A and 2B are not necessarily to scale, but have been rendered for purposes of explanation only in describing the arrangement of the example eye-mountable electronic device 210. The eye-mountable device 210 is formed of a polymeric material 220 shaped as a curved disk. The polymeric material 220 can be a substantially transparent material to allow incident light to be transmitted to the eye while the eye-mountable device 210 is mounted to the eye. The polymeric material 220 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 220 can be formed with one side having a concave surface 226 suitable to fit over a corneal surface of an eye. The opposite side of the disk can have a convex surface 224 that does not interfere with eyelid motion while the eye-mountable device 210 is mounted to the eye. A circular outer side edge 228 connects the concave surface 224 and convex surface 226.

The eye-mountable device 210 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 210 can be selected according to the size and/or shape of the corneal surface of the wearer's eye.

The polymeric material 220 can be formed with a curved shape in a variety of ways. For example, techniques similar to those employed to form vision-correction contact lenses, such as heat molding, injection molding, spin casting, etc. can be employed to form the polymeric material 220. While the eye-mountable device 210 is mounted in an eye, the convex surface 224 faces outward to the ambient environment while the concave surface 226 faces inward, toward the corneal surface. The convex surface 224 can therefore be considered an outer, top surface of the eye-mountable device 210 whereas the concave surface 226 can be considered an inner, bottom surface. The "bottom" view shown in FIG. 2A is facing the concave surface 226. From the bottom view shown in FIG. 2A, the outer periphery 222, near the outer circumference of the curved disk is curved to extend out of the page, whereas the central region 221, near the center of the disk is curved to extend into the page.

A substrate 230 is embedded in the polymeric material 220. The substrate 230 can be embedded to be situated along the outer periphery 222 of the polymeric material 220, away from the central region 221. The substrate 230 does not interfere with vision because it is too close to the eye to be in focus and is positioned away from the central region 221 where incident light is transmitted to the eye-sensing portions of the eye. Moreover, the substrate 230 can be formed of a transparent material to further mitigate effects on visual perception.

The substrate 230 can be shaped as a flat, circular ring (e.g., a disk with a centered hole). The flat surface of the substrate 230 (e.g., along the radial width) is a platform for mounting electronics such as chips (e.g., via flip-chip mounting) and for patterning conductive materials (e.g., via microfabrication techniques such as photolithography, deposition, plating, etc.) to form electrodes, antenna(e), and/or interconnections. The substrate 230 and the polymeric material 220 can be approximately cylindrically symmetric about a common central axis. The substrate 230 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 230 can be implemented in a variety of different form factors, similar to the discussion of the substrate 130 in connection with FIG. 1 above.

A loop antenna 270, controller 250, and sensor electronics 260 are disposed on the embedded substrate 230. The controller 250 can be a chip including logic elements configured to operate the sensor electronics 260 and the loop antenna 270. The controller 250 is electrically connected to the loop antenna 270 by interconnects 257 also situated on the substrate 230. Similarly, the controller 250 is electrically connected to the sensor electronics 260 by an interconnect 251. The interconnects 251, 257, the loop antenna 270, and any conductive electrodes (e.g., for an electrochemical analyte sensor, etc.) can be formed from conductive materials patterned on the substrate 230 by a process for precisely patterning such materials, such as deposition, photolithography, etc. The conductive materials patterned on the substrate 230 can be, for example, gold, platinum, palladium, titanium, carbon, aluminum, copper, silver, silver-chloride, conductors formed from noble materials, metals, combinations of these, etc.

As shown in FIG. 2A, which is a view facing the convex surface 224 of the eye-mountable device 210, the sensor electronics module 260 can be mounted to a side of the substrate 230 facing the convex surface 226. Where the sensor electronics module 260 includes an image sensor, for example, mounting such an image sensor on the substrate 230 to be facing the convex surface 226 (i.e., in an outward direction from the surface of the eye) allows the sensor to capture images corresponding to the field of vision of the eye. However, the electronics, electrodes, etc. situated on the substrate 230 can be mounted to either the "inward" facing side (e.g., situated closest to the concave surface 226) or the "outward" facing side (e.g., situated closest to the convex surface 224). Moreover, in some embodiments, some electronic components can be mounted on one side of the substrate 230, while other electronic components are mounted to the opposing side, and connections between the two can be made through conductive materials passing through the substrate 230.

The loop antenna 270 is a layer of conductive material patterned along the flat surface of the substrate to form a flat conductive ring. In some examples, to allow additional flexibility along the curvature of the polymeric material, the loop antenna 270 can include multiple substantially concentric sections electrically joined together. Each section can then flex independently along the concave/convex curvature of the eye-mountable device 210. In some examples, the loop antenna 270 can be formed without making a complete loop. For instances, the antenna 270 can have a cutout to allow room for the controller 250 and sensor electronics 260, as illustrated in FIG. 2A. However, the loop antenna 270 can also be arranged as a continuous strip of conductive material that wraps entirely around the flat surface of the substrate 230 one or more times. For example, a strip of conductive material with multiple windings can be patterned on the side of the substrate 230 opposite the controller 250 and sensor electronics 260. Interconnects between the ends of such a wound antenna (e.g., the antenna leads) can then be passed through the substrate 230 to the controller 250.

Figure 2D:
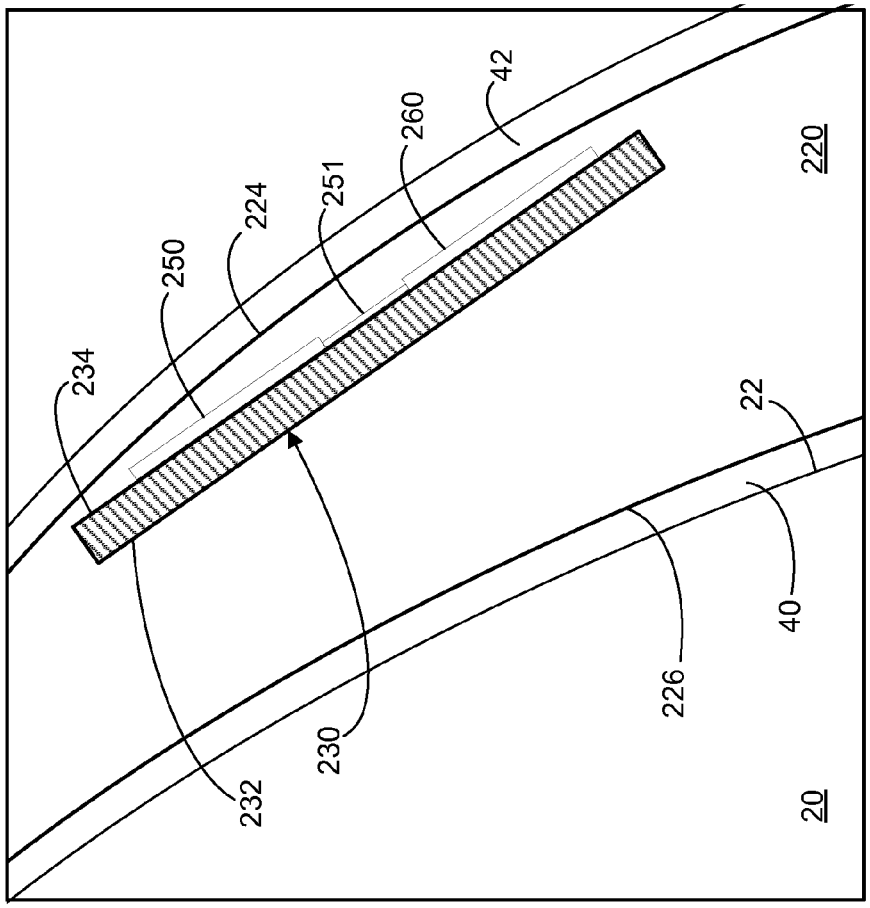
FIG. 2D is a side cross-section view enhanced to show the electronics on the example eye-mountable device when mounted as shown in FIG. 2C.
Figure 2C:
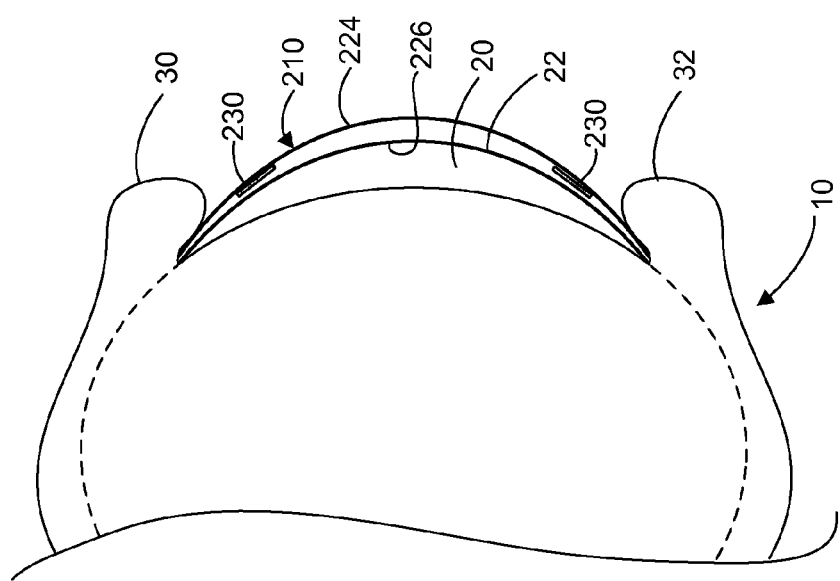
FIG. 2C is a side cross-section view of the example eye-mountable device shown in FIGS. 2A and 2B while mounted to a corneal surface of an eye.

FIG. 2C is a side cross-section view of the example eye-mountable electronic device 210 while mounted to a corneal surface 22 of an eye 10. FIG. 2D is a close-in side cross-section view enhanced to show the sensor electronics 260 on the example eye-mountable device 210 when mounted as shown in FIG. 2C. As shown in FIG. 2D, while mounted to the corneal surface 22, tear film layers 40, 42 coat the concave surface 226 and convex surface 224. It is noted that the relative dimensions in FIGS. 2C and 2D are not necessarily to scale, but have been rendered for purposes of explanation only in describing the arrangement of the example eye-mountable electronic device 210. For example, the total thickness of the eye-mountable device can be about 200 micrometers, while the thickness of the tear film layers 40, 42 can each be about 10 micrometers, although this ratio may not be reflected in the drawings. Some aspects are exaggerated to allow for illustration and facilitate explanation.

The eye 10 includes a cornea 20 that is covered by bringing the upper eyelid 30 and lower eyelid 32 together over the top of the eye 10. Incident light is received by the eye 10 through the cornea 20, where light is optically directed to light sensing elements of the eye 10 (e.g., rods and cones, etc.) to stimulate visual perception. The motion of the eyelids 30, 32 distributes a tear film across the exposed corneal surface 22 of the eye 10. The tear film is an aqueous solution secreted by the lacrimal gland to protect and lubricate the eye 10. When the eye-mountable device 210 is mounted in the eye 10, the tear film coats both the concave and convex surfaces 224, 226 with an inner layer 40 (along the concave surface 226) and an outer layer 42 (along the convex layer 224). The tear film layers 40, 42 can be about 10 micrometers in thickness and together account for about 10 microliters.

The tear film layers 40, 42 are distributed across the corneal surface 22 and/or the convex surface 224 by motion of the eyelids 30, 32. For example, the eyelids 30, 32 raise and lower, respectively, to spread a small volume of tear film across the corneal surface 22 and/or the convex surface 224 of the eye-mountable device 210. The tear film layer 40 on the corneal surface 22 also facilitates mounting the eye-mountable device 210 by capillary forces between the concave surface 226 and the corneal surface 22. In some embodiments, the eye-mountable device 210 can also be held over the eye in part by vacuum forces against corneal surface 22 due to the concave curvature of the eye-facing concave surface 226.

As shown in the cross-sectional views in FIGS. 2C and 2D, the substrate 230 can be inclined such that the flat mounting surfaces of the substrate 230 are approximately parallel to the adjacent portion of the concave surface 226. As described above, the substrate 230 is a flattened ring with an inward-facing surface 232 (closer to the concave surface 226 of the polymeric material 220) and an outward-facing surface 234 (closer to the convex surface 224). The substrate 230 can have electronic components and/or patterned conductive materials mounted to either or both mounting surfaces 232, 234. As shown in FIG. 2D, the sensor electronics 260, controller 250, and conductive interconnect 251 are mounted on the outward-facing surface 234 such that the sensor electronics 260 are relatively closer in proximity to the convex surface 224 than if they were mounted on the inward-facing surface 232.

III. Example Ophthalmic Image Sensor

Figure 3:
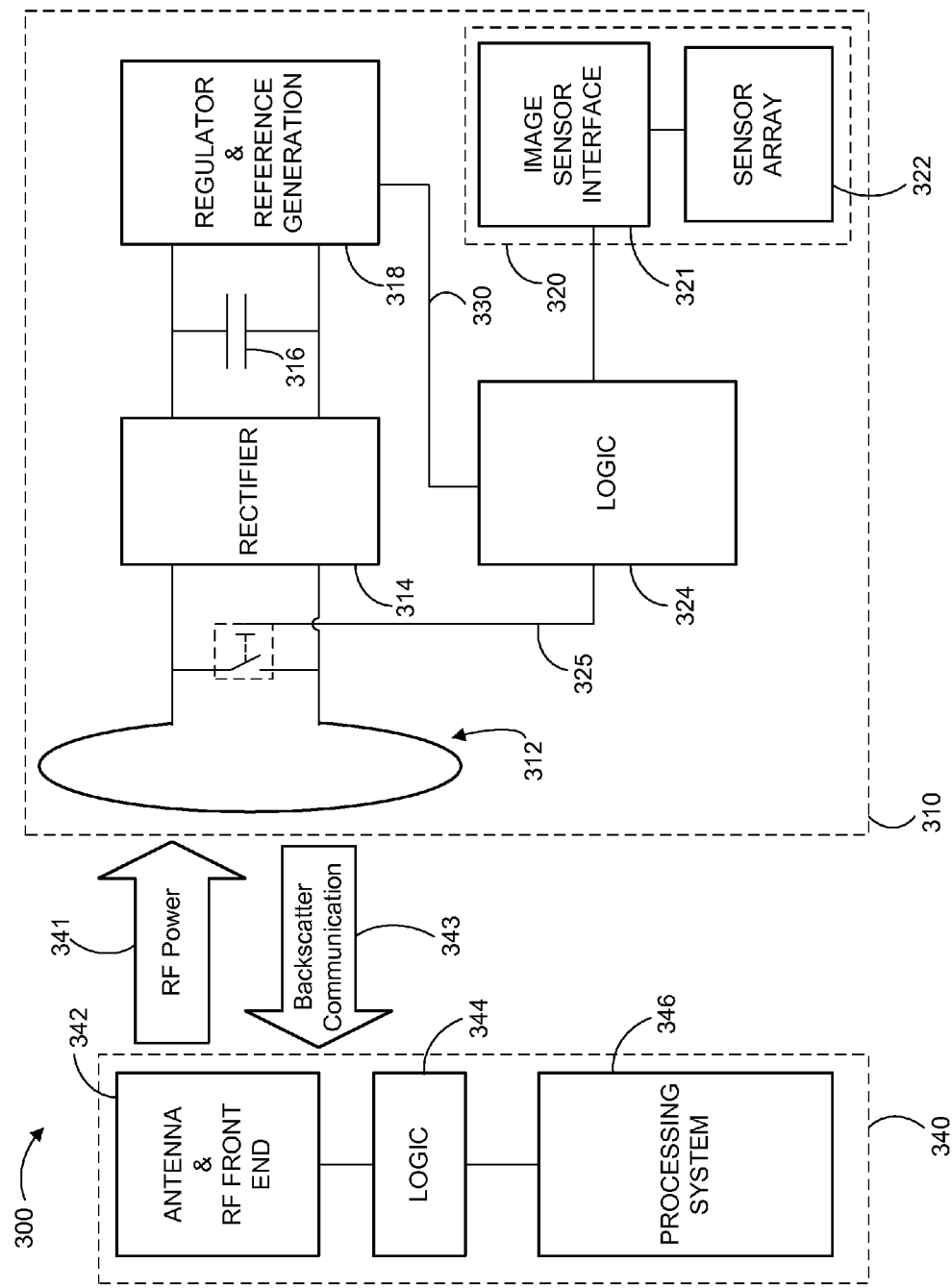
FIG. 3 is a functional block diagram of an example system configured to capture an image using an eye-mountable device.

FIG. 3 is a functional block diagram of a system 300 for capturing an image using an eye-mountable device. The system 300 includes an eye-mountable device 310 with embedded electronic components powered by an external reader 340. The eye-mountable device 310 includes an antenna 312 for capturing radio frequency radiation 341 from the external reader 340. The eye-mountable device 310 includes a rectifier 314, an energy storage 316, and regulator 318 for generating power supply voltages 330, 332 to operate the embedded electronics. The eye-mountable device 310 includes an image sensor 320 with a sensor array 322 driven by a sensor interface 321. The eye-mountable device 310 includes hardware logic 324 for communicating results from the image sensor 320 to the external reader 340 by modulating the impedance of the antenna 312. An impedance modulator 325 (shown symbolically as a switch in FIG. 3) can be used to modulate the antenna impedance according to instructions from the hardware logic 324. Similar to the eye-mountable devices 110, 210 discussed above in connection with FIGS. 1 and 2, the eye-mountable device 310 can include a mounting substrate embedded within a polymeric material configured to be mounted to an eye.

The image sensor 320 can be situated on a mounting surface of such a substrate proximate the surface of the eye (e.g., corresponding to the sensor electronics 260 on the outward-facing side 234 of the substrate 230) to measure light incident on the eye from the surrounding environment (i.e., to obtain images corresponding to a field of view of the eye). In some embodiments, however, an image sensor can be situated on a mounting surface of such a substrate proximate the surface of the eye (e.g., corresponding to the inward-facing side 232 of the substrate 230) to measure light reflected from the eye (i.e., to obtain images of the eye itself).

With reference to FIG. 3, the image sensor 320 obtains images by exposing the sensor array 322 to incident light, and then using the image sensor interface 321 to read out values corresponding to the amount of light received across the sensor array 322. The sensor array 322 can include multiple photo-sensitive elements each configured to generate an electronic output signal in response to received light. For example, the sensor array 322 can include a pixelated array of elements, each of which can include a photodiode and one or more thin film transistors configured to output a voltage corresponding to light received during a given exposure interval. Such photo-sensitive arrays can be implemented using complementary metal oxide semiconductor (CMOS) technologies, charge coupled device (CCD) technologies, or other technologies including an array of pixelated photo-sensitive electronics.

In order for the pattern of incident light detected via the sensor array 322 to correspond to an image of the surrounding environment, the light incident on the sensor array 322 can be directed/routed such that light incident on different regions of the sensor array 322 corresponds to light from a respective direction of the surrounding environment. Conventional camera systems may provide such direction selectivity using a primary lens that focuses incoming light onto a focal plane coincident with the photo-sensitive plane of the sensor array. By contrast, systems employed herein use a non-focusing, pin-hole type aperture. Light incident on the sensor array 322 passes through the non-focusing aperture, and so light passing through the aperture from different directions illuminates different regions of the image sensor array 322. As a result of such an arrangement, distinct regions of the sensor array 322 receive light from distinct directions in the surrounding environment. A thin opaque layer of metal or another material can be situated, at least approximately, in a parallel plane to the image sensor array 322. An aperture is then formed near the center of the opaque later to allow light to pass through to the sensor array 322, and light incident on other areas of the opaque layer is blocked (e.g., reflected). The non-focusing aperture can have an area comparable to a photo-sensitive area of a typical photo-sensitive element. For example, the diameters of the aperture and the photodiodes in each photo-sensitive element can be at least roughly equal, such as within about 50%. In some examples, the aperture can be larger than the individual photo-sensitive elements to account for reduced light transmission caused by shadowing, vignetting, and/or diffraction. Examples of such non-focusing pinhole apertures are described below in connection with FIGS. 5-8.

The rectifier 314, energy storage 316, and voltage regulator 318 operate to harvest energy from received radio frequency radiation 341. The radio frequency radiation 341 inductively causes radio frequency electrical signals on leads of the antenna 312. The rectifier 314 is connected to the antenna leads and converts the radio frequency electrical signals to a DC voltage. The energy storage 316 (e.g., capacitor) is connected across the output of the rectifier 314 to filter out high frequency components of the DC voltage. The regulator 318 receives the filtered DC voltage and outputs a digital supply voltage 330 to operate the hardware logic 324. The digital supply voltage 330 can be a voltage suitable for driving digital logic circuitry, such as approximately 1.2 volts, approximately 3 volts, etc. Reception of the radio frequency radiation 341 from the external reader 340 (or another source, such as ambient radiation, etc.) causes the supply voltage 330 to be supplied to the hardware logic 324. The supply voltage 330 can also power the image sensor 320 (e.g., by biasing the photodiodes, etc.) to cause the photo-sensitive elements in the sensor array 322 to begin responding to incident light. While powered, the image sensor 320 and hardware logic 324 are configured to obtain an image of the surrounding environment by measuring incident light and communicate the results.

The sensor results can be communicated back to the external reader 340 via backscatter radiation 343 from the antenna 312. The hardware logic 324 receives the output current from the electrochemical sensor 320 and modulates (325) the impedance of the antenna 312 in accordance with the measurements from the image sensor 320. The antenna impedance and/or change in antenna impedance is detected by the external reader 340 via the backscatter signal 343. The external reader 340 can include an antenna front end 342 and logic components 344 to decode the information indicated by the backscatter signal 343 and provide digital inputs to a processing system 346. The external reader 340 associates the backscatter signal 343 with an image obtained using the sensor 320 (e.g., via the processing system 346 according to a pre-programmed relationship associating impedance of the antenna 312 with output from the sensor 320). The processing system 346 can then store the indicated sensor results (e.g., images) in a local memory and/or an external memory (e.g., by communicating with the external memory through a network).

In some embodiments, one or more of the features shown as separate functional blocks can be implemented ("packaged") on a single chip. For example, the eye-mountable device 310 can be implemented with the rectifier 314, energy storage 316, voltage regulator 318, sensor interface 321, sensor array 322, and the hardware logic 324 packaged together in a single chip or controller module. Such a controller can have interconnects ("leads") connected to the loop antenna 312.

Figure 4A:
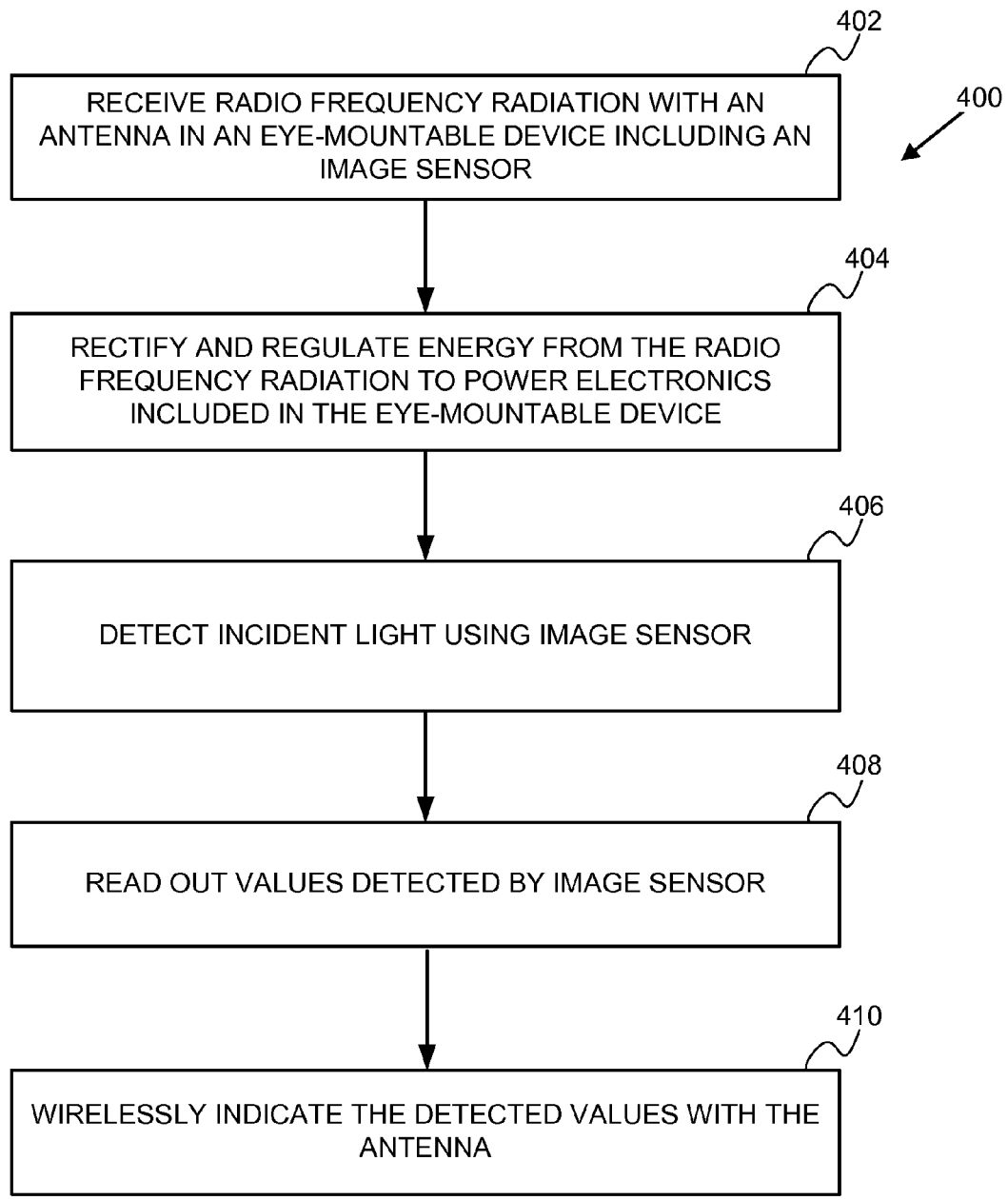
FIG. 4A is a flowchart of an example process for operating an image sensor in an eye-mountable device to capture an image.

FIG. 4A is a flowchart of a process 400 for operating an image sensor in an eye-mountable device to obtain an image. Radio frequency radiation is received at an antenna in an eye-mountable device including an integrated image sensor (402). Electrical signals due to the received radiation are rectified and regulated to power the image sensor and associated controller (404). For example, a rectifier and/or regulator can be connected to the antenna leads to output a DC supply voltage for powering one or more of the image sensor and/or other electronics, such as an electrochemical sensor, if included. The image sensor detects incident light to allow the image sensor to detect an image of the surrounding environment (406). In some examples, the image sensor may be exposed to incident light via an integrated shutter device to control the timing and duration in which the image sensor array is exposed to incident light. However, the image detection operation can optionally be electronically controlled without a shutter mechanism (e.g., by activating and deactivating the image sensor to detect incident light). Values across the image sensor array are read out (e.g., measured) using read out electronics (408). For example, TFTs associated with photodiodes in each photo-sensitive element can be used to read a voltage value indicative of the light incident on the photo-sensitive element during the exposure. The detected voltage values can then be wirelessly indicated with the antenna (410). For example, backscatter radiation can be manipulated to indicate the image sensor output by modulating the antenna impedance.

Figure 4B:
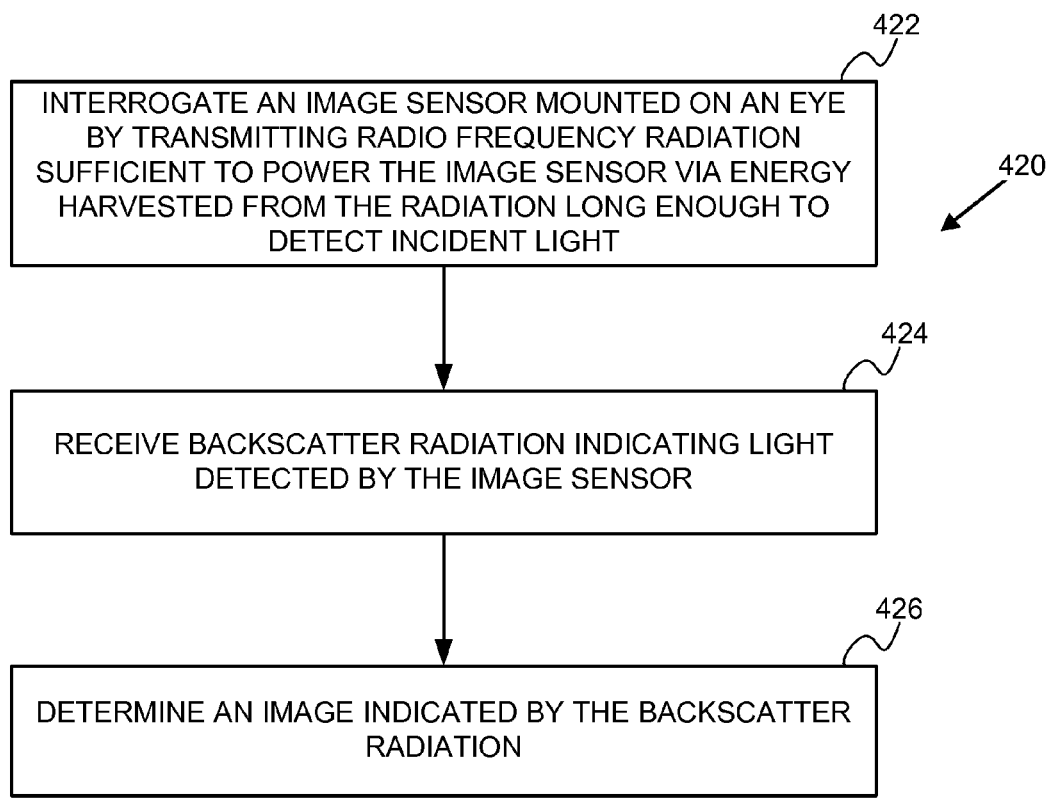
FIG. 4B is a flowchart of an example process for operating an external reader to interrogate an image sensor in an eye-mountable device to capture an image.

FIG. 4B is a flowchart of a process 420 for operating an external reader to interrogate an image sensor in an eye-mountable device to obtain an image. Radio frequency radiation sufficient to power an image sensor via harvested energy long enough to detect incident light is transmitted to an image sensor included in an eye-mountable device (422). For example, the radio frequency radiation used to power the image sensor can be similar to the radiation 341 transmitted from the external reader 340 to the eye-mountable device 310 described in connection with FIG. 3 above. The external reader then receives backscatter radiation indicating the measurement by the image sensor (424). For example, the backscatter radiation can be similar to the backscatter signals 343 sent from the eye-mountable device 310 to the external reader 340 described in connection with FIG. 3 above. The backscatter radiation received at the external reader is then used to determine an image (426). In some cases, the data indicative of the determined image can be stored in the external reader memory (e.g., in the processing system 346) and/or a network-connected data storage.

For example, the detected image sensor values can be encoded in the backscatter radiation by modulating the impedance of the backscattering antenna. The external reader can detect the antenna impedance and/or change in antenna impedance based on a frequency, amplitude, and/or phase shift in the backscatter radiation. The sensor values can then be extracted by associating the impedance value with the sensor result by reversing the encoding routine employed within the eye-mountable device. Thus, the reader can map a detected antenna impedance value to an image sensor value (e.g., a measure of light received at one or more elements of the sensor array 322). The sensor values can then be used to determine an image by combining such values from across the sensor array 322 in accordance with calibration information, which may be empirically derived calibration, for example.

IV. Non-Focusing "Pin-Hole" Aperture

Figure 5A:
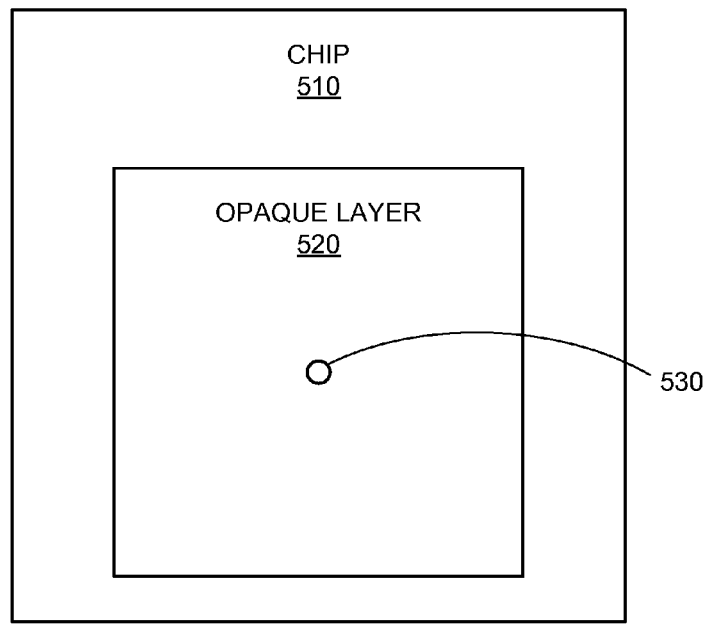
FIG. 5A is a top view of an example chip with an integrated pin-hole camera.
Figure 5B:
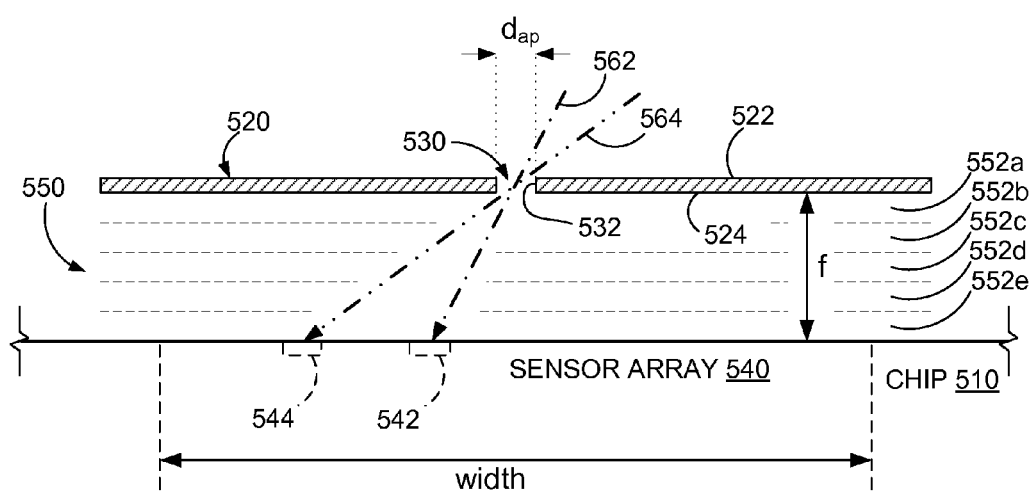
FIG. 5B is a side cross-section view of the example chip shown in FIG. 5A.

FIG. 5A is a top view of an example chip 510 with an integrated pin-hole camera. FIG. 5B is a side cross-section view of the example chip 510 shown in FIG. 5A. The chip 510 can be mounted on a substrate incorporated in an eye-mountable device, such as the substrate 230 in the eye-mountable device 210. The chip 510 can be forged to include an integrated photo-sensitive layer 540, such as a silicon layer including a pattern of photo-sensitive elements (e.g., photodiodes) and associated driving circuits for read-out/reset including one or more TFTs, for example. The photo-sensitive array 540 is situated to receive incident light that passes through an aperture 530 in an opaque layer 520. The opaque layer 520 can be a layer of metal or another opaque material, such as a polymeric material, for example. The opaque layer 520 can be situated substantially parallel to the plane of the sensor array 540. The opaque layer 520 reflects or otherwise blocks incident light from reaching the sensor array 540. As a result, the sensor array 540 receives light through the pin-hole aperture 530. The pin-hole aperture 530 creates a point source of light that illuminates the sensor array 540 such that incident light from distinct directions illuminates distinct regions of the sensor array 540.

As shown in FIG. 5B, light rays 562, 564 are incident on the image sensor from distinct directions. In particular, the two light rays 562, 564 are oriented at different angles with respect to a central optical axis of the image sensor that is approximately normal to the plane of the sensor array 540 and that passes through the aperture 530. In some examples, the central optical axis can approximately bisect the sensor array 540 such that the aperture 530 is centered over the sensor array 540, at least approximately. The light ray 564 can be oriented at a greater angle to such optical axis than the light ray 562. The light ray 564 enters the aperture 530 from a relatively large offset angle, relative to the central optical axis, and illuminates a region 544 of the sensor array 540. Similarly, the light ray 562 enters the aperture 530 from relatively smaller offset angle, relative to the central optical axis, and illuminates a region 542 of the sensor array 540 that is distinct from the region 544. Because the incident angle of the ray 564 is greater than ray 562, the region 544 is farther from the central optical axis than the region 542 (e.g., the region 544 is relatively further than the region 542 from a point on the sensor array 540 through which the central optical axis passes).

The opaque layer 520 includes an outer surface 522 and an inner surface 524, and can have a thickness of about one micrometer to a few micrometers. The opaque layer 520 can include a metallic material or a polymeric material. The opaque layer 520 can be formed during chip fabrication in a foundry environment by developing a layer of metallic material using a microfabrication process, such as deposition, electroplating, photolithography, etc The thickness and/or material selection of the opaque layer 520 can be selected to provide sufficient structural rigidity to allow the opaque layer 520 to span the region over the sensor array 540. In addition, the material and/or thickness of the opaque layer 520 can be selected to be suitable for creating a precise, thin edge on the inner lip 532 of the aperture 530 in order to mitigate the effects of distortions from vignetting and/or shadowing that reduce light transmission to the sensor array 540, particularly away from the central optical axis. The opaque layer 520 may have a thickness in a range from about 100 nanometers to a few micrometers (e.g., 2-3 micrometers). In embodiments in which the opaque layer 520 is applied directly to the layered conductive and/or spacer components developed over the sensor array 540, the thickness of the opaque layer 520 can be relatively small (e.g., about 100 nanometers or a few hundred Angstroms), because the opaque layer 520 is substantially continuously supported by the top-most layer 550a of the stacked circuitry components 550 and therefore experiences relatively low amounts of strain transverse to the surface of the opaque layer 520.

The opaque layer 520 is therefore separated from the sensor array 540 as illustrated in FIG. 5B. The separation distance between the aperture 530 (which is formed in the opaque layer 520) and the photo-sensitive plane of the sensor array 540 define the focal length f of the pin-hole camera image sensor. The opaque layer 520 can be formed over one or more stacked circuit elements 550 on the sensor array 540, such as stacked metallic or other conductive materials used to form TFTs, interconnects, row/column lines, or other readout/driving circuitry, developed on the sensor array 540. Additionally or alternatively, one or more spacer components, such as formed of oxides, dielectrics, etc., may also be used to separate the opaque layer 520 from the sensor array 540. The layered circuit components 550a-e can optionally include a plurality of conductive layers (e.g., including readout lines, etc.) in layers closest to the image sensor array 540 (e.g., the layers 550d-e) and a number of spacer layers including substantially transparent oxides such as silicon dioxide (e.g., the layers 550a-c). In some cases at least some of the layers 550a-e include substantially transparent materials to permit incident light 562-564 to reach the sensor array 540. For example, the layers 550a-e may include dielectric materials such as silicon dioxide, conductive materials such as indium tin oxide, and/or other examples of at least partially transparent materials. In some examples, opaque conductive materials such as copper and/or aluminum can be patterned so as to be included in one or more of the layers 550a-e. In such examples, the patterned conductive materials may partially interfere with (e.g., block) light transmission to the photo-sensitive array 540. The opaque layer 520 can then be formed over the exposed surface of the layered circuit components 550 such that the opaque layer 520 is separated from the sensor array 540 by the focal length f. In some examples, sidewalls of opaque material can be formed along outer edges of the sensor array 540 to isolate the sensor array 540 from light other than that which enters the aperture 530. Such opaque features can be created from patterned materials included in the outer regions of the stacked circuit components 550 disposed on the sensor array 540, for example.

In some examples, portions of the opaque layer 520 may at least partially be formed directly on stacked circuit components 550 across the sensor array 540. The focal length f can be adjusted by adding or subtracting layers from the stacked circuit components 550a-e. For example, the focal length f can be increased by adding additional dielectric layers over the layer 550a, or the focal length f can be decreased by removing dielectric layers from the stack. In some examples, each of the stacked layers has a thickness of approximately 1 micrometer, and 10 total layers can be used to create a focal length f of about 10 micrometers. In some examples, a network of readout/reset lines and/or other driving circuitry for operating the sensor array 540 can be formed in 4 layers nearest the surface of the sensor array 540 (e.g., the array of photo-sensitive elements) and additional layers of dielectric material can be added to create a desired focal length.

The sensor array 540 can have an area that is larger than the area of the aperture 530. For example, the aperture 530 can have a diameter $d_{ap}$ of a few micrometers. For example, the aperture diameter $d_{ap}$ may be in the range from about 1 micrometer to about 5 micrometers, and may be approximately 3 micrometers. On the other hand, the width of the sensor array 540 can be about 10 times as large as the aperture diameter $d_{ap}$ (or even greater), such that incident light passing through the aperture 530 illuminates substantially different regions of the sensor array 540 (e.g., the regions 542, 544 illuminated by the light rays 562, 564). For example, the width can be in the range from about 30 micrometers to about 200 micrometers, and may be approximately 40 micrometers. With sensor pixel dimensions of about 2 micrometers by 2 micrometers, a sensor array that is about 40 micrometers wide provide sufficient space for a 20 by 20 sensor pixel array.

As noted above, the sensor array 540 can include multiple photo-sensitive elements, which can be arranged in rows and columns across the sensor array 540 such that light illuminating different regions of the sensor array 540 can be distinguished. For example, one or more such photo-sensitive elements near the region 542 can be illuminated by the light ray 562 and one or more photo-sensitive elements near the region 544 can be illuminated by light ray 564. Reading out indications of the received intensity from each pixel in the sensor array 540 thereby provides an indication of the amount of light received from different directions, which can then be used to determine an image representing the scene. The resolution of the pin-hole image sensor system (i.e., the ability to distinguish light from different directions) is dependent on both the density of photo-sensitive elements in the sensor array 540 and the diameter of the pin-hole aperture 530. Generally, the aperture diameter $d_{ap}$ can be approximately equal to, or comparable to (e.g., within about 50%), the dimensions of the individual photo-sensitive elements in the sensor array 540. In such an arrangement, the light passing through the aperture 530 from a given direction illuminates the sensor array 540 with a spot size approximately equal to the typical area of a photo-sensitive element in the sensor array 540.

In some examples, the aperture diameter $d_{ap}$ can be larger than the typical photo-sensitive element dimensions (e.g., between about 100% and 200% of a size of the photo-sensitive element). Using an aperture sized larger than typical photo-sensitive elements may at least partially compensate for reduced light passage at large angles relative to the central optical axis of the image sensor system. As shown in FIG. 5B, the light ray 564 is at least partially shadowed due to the thickness of the inner lip 532 of the aperture 530 in the opaque layer 520. For example if the thickness of the inner lip 532 is comparable to the aperture diameter $d_{ap}$, light incident at greater than 45 degrees relative to the central optical axis is entirely blocked/shadowed by the inner lip 532.

Figure 5C:
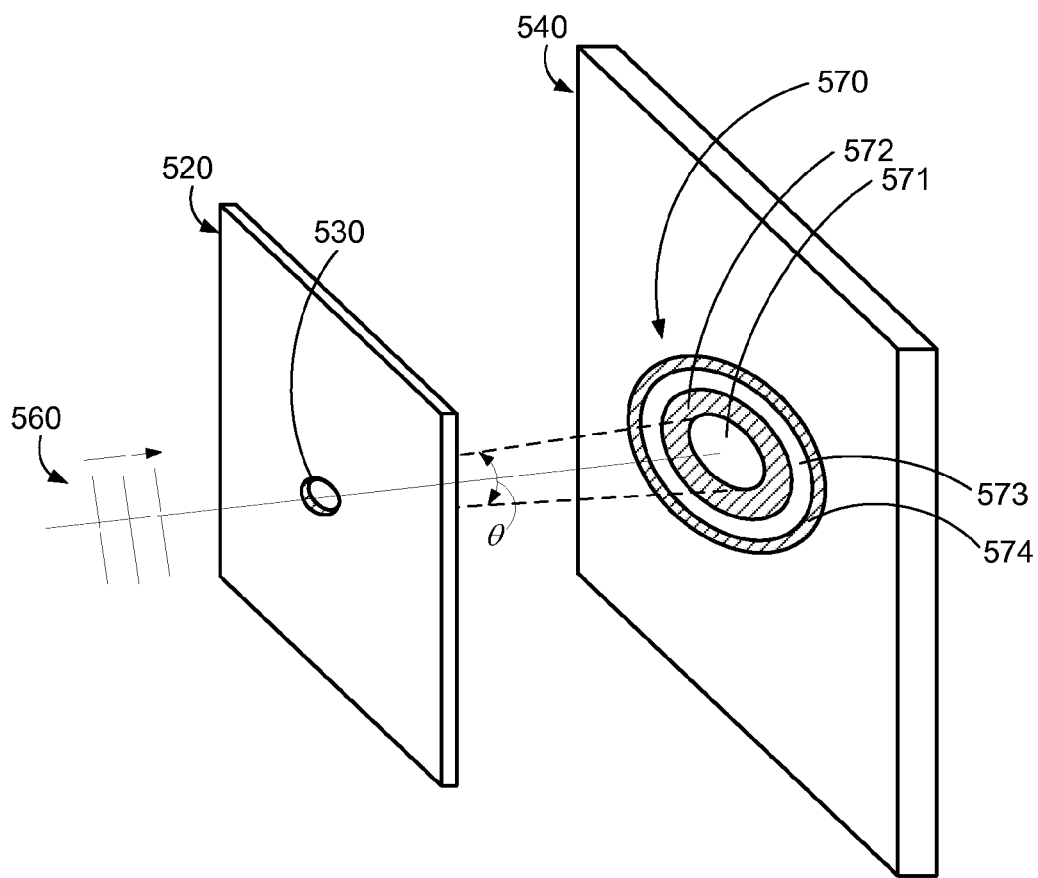
FIG. 5C illustrates a diffraction effects on incident light passing through the aperture.

In addition, the image sensor system can be configured to at least partially account for diffraction spreading effects of light passing through the aperture 530. Light passing through the aperture 530 spreads due to diffraction (i.e., constructive and destructive interference between different wave fronts of light entering the aperture 530 from different directions). The dimensions of the resulting diffraction pattern 570 are determined by the size of the aperture 530 (e.g., the aperture diameter $d_{ap}$) and the distance between the aperture 530 and the sensor array 540 (e.g., the focal length f). FIG. 5C illustrates diffraction effects on incident light 560 passing through the aperture 530. As shown in FIG. 5C, the incident light 530 spreads after passing through the aperture 530 and creates a diffraction pattern 570 on the sensor array 540. The diffraction pattern 570 includes a central disk 571 surrounded by a darkened ring 572 due to destructive interference. A region of constructive interference surrounds the darkened ring 572 in a ring 573, and another darkened ring 574 surrounds that. The illustration of the diffraction pattern 570 in FIG. 5C is intended to facilitate understanding and explanation and is not necessarily rendered to scale. Moreover, the diffraction pattern 570 may extend beyond the ring 574 in a series of alternating bright/dark rings that gradually decrease in intensity due to alternating regions of constructive and destructive interference. For incident radiation 560 that propagates substantially normal to the opaque layer 520, the central disk 571 can have a size that is larger than the area of the aperture 530 due to angular spreading of the light after it passes through the aperture 530. The angular spreading effect is indicated in FIG. 5C by the angle θ between the dashed lines directed to the outer edges of the disk 571. The amount of angular spreading depends in part on the size of the aperture diameter $d_{ap}$ relative to the wavelength λ of the incident light, that is θ at least approximately scales with $d_{ap}/\lambda$. For example, if the aperture diameter $d_{ap}$ is less than λ, the diffraction-based angular spreading can be so great that the light emerging from the aperture 530 resembles a point source radiating in all directions. For wavelengths in the visible spectrum (e.g., approximately 400-750 nanometers), an aperture diameter $d_{ap}$ on the order of a few micrometers prevents the diffraction spreading from overwhelming the direction-sensitivity of the incident radiation.

4a) Front-Side Illumination

Figure 5D:
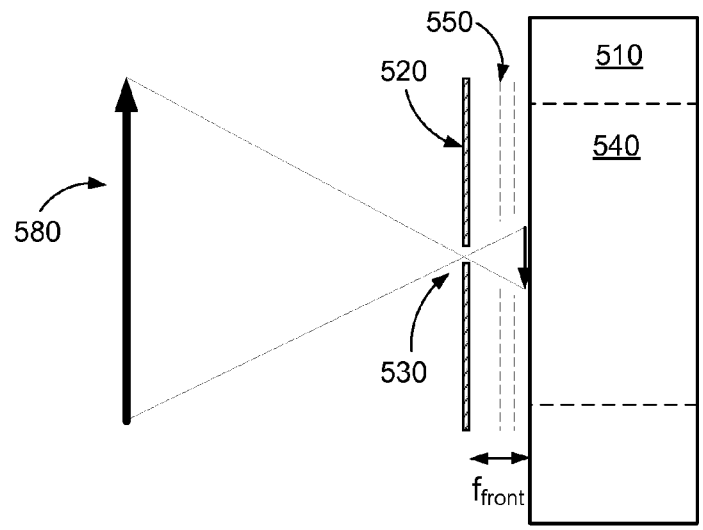
FIG. 5D is a side view cross-section view illustrating imaging an object with a front-side illuminated image sensor though a pin-hole aperture according to an example embodiment.

FIG. 5D is a side cross-section view illustrating imaging an object 580 with a front-side illuminated image sensor though a pin-hole aperture 530 according to an example embodiment. The arrangement of the image sensor system in FIG. 5D is similar to the arrangement described in FIGS. 5A-5B. The opaque layer 520 can be situated to be substantially in parallel to the sensor array 540. The aperture 530 in the opaque layer 520 allows incident light to pass through the aperture 530 to be detected by the sensor array 540. The aperture 530 can be positioned near the center of the opaque layer 520 (and approximately equidistant from the outer edges of the sensor array 540). Light indicative of the object 580 passes through the aperture 530 to form an inverted representation of the object 580 on the sensor array 540, as indicated by the dotted lines traced from the head/tail of the object 580 to the head/tail of the inverted image. The front-side illumination system is able to obtain an image of the object 580 even without using any focusing optics, such as lenses, etc. by employing the pin-hole aperture 530 to cause the light reaching the sensor array to have direction-dependence.

The distance from the aperture 530 to the sensor array 540 (labeled as $f_{front}$) is the focal length of the imaging system when arranged for front-side illumination as in FIG. 5D. The focal length distance $f_{front}$ can be at least approximately controlled by the number and/or thickness of layered circuit components 550 formed over the sensor array 540. For an example value of 10 micrometers for $f_{front}$, the front-side illumination image sensor system can capture images with focal ratios ($f_{front}/d_{ap}$) between about 2 and 5, for example. The front-side illumination image capture system also has a relatively wide field of view. The field of view can include an approximately conical region symmetric about the central optical axis and with an apex located at the aperture 530 and with an opening angle of approximately 120 degrees (e.g., 60 degrees in all directions, relative to the central optical axis).

The arrangement in FIG. 5D is referred to as a front side illumination imaging system because the light is incident on the sensor array 540 from the side of the sensor array 540 that includes stacked circuitry components for read out and/or driving circuits operating the photo-sensitive elements (e.g., photodiodes) in the sensor array 540. The side with the stacked circuit components (e.g., the conductive layer) is therefore generally referred to as the "front side" during assembly of the chip 510.

4b) Back-Side Illumination

Figure 5E:
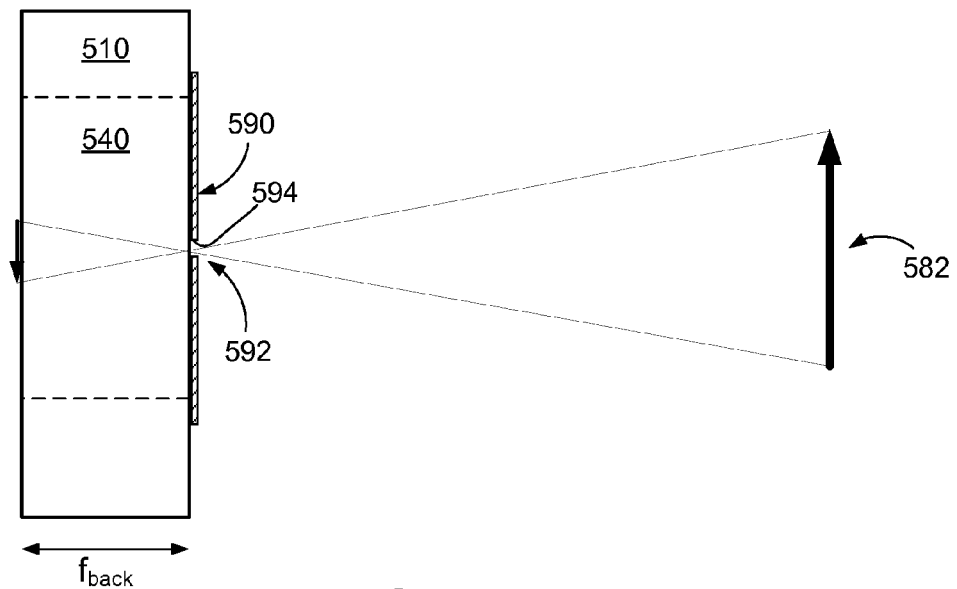
FIG. 5E is a side view cross-section view illustrating imaging an object with a back-side illuminated image sensor though a pin-hole aperture according to an example embodiment.

FIG. 5E is a side view cross-section view illustrating imaging an object with a back-side illuminated image sensor though a pin-hole aperture 592 according to an example embodiment. The image sensor system in FIG. 5E includes an opaque layer 590 applied directly to the back side of the silicon chip 510 that includes the sensor array 540. The back side of the chip 510 may be thinned prior to applying the opaque layer, such as by grinding, polishing, etc. An aperture 592 is formed in the opaque layer 590 to allow light to pass through the chip 510 to be received by the photo-sensitive elements in the sensor array 540 on the opposite side of the chip. The opaque layer can be a metallized layer formed during chip assembly by a microfabrication technique, or can optionally include a polymeric material applied to the backside of the chip 510. For a metallized layer implementation, the resulting layer of opaque metal material can have a thickness less than one micrometers, such as a thickness of a few hundreds Angstroms, because the metal is applied directly to the back side of the chip. Thus, the thickness of the inner lip 594 of the aperture 592 can also be much less than one micrometer, and the attendant issues with shadowing, vignetting, etc., due to the finite thickness of the pin-hole aperture 592 may therefore be reduced relative to those encountered in a front-side illumination scheme. The back-side illumination imaging system can be used to obtain an inverted image of the object 582, as indicated by the dotted lines connecting the head/tail of the object 582 to the head/tail of the inverted image. Similar to the front-side illumination system, the back-side illumination system is able to obtain an image of the object 582 even without using any focusing optics, such as lenses, etc. by employing the pin-hole aperture 592 to cause the light reaching the sensor array to have direction-dependence.

The distance from the aperture 592 to the photo-sensitive elements in the sensor array 540 (labeled as $f_{back}$) defines the focal length of the back-side illumination system. For an example value of about 80 micrometers for $f_{back}$, the back-side illumination image sensor system can capture images with focal ratios ($f_{back}/d_{ap}$) between about 8 and 30, for example. The back-side illumination image capture system may have a relatively narrow field of view in comparison to the front-side imaging system, because of the relatively greater focal length afforded by $f_{back}$, and the size limitations in scaling the sensor array 540 by a similar proportion.

4c) Sensor Array Pixel Patterns

The sensor arrays for detecting incident light in the imaging systems described in connection with FIGS. 1-5 above may be arranged in a variety of different ways. Some example arrangements are described in further detail below in connection with FIGS. 6A-6D. Generally, the sensor array may be integrated onto a chip mounted to a substrate that is embedded in an eye-mountable device, similar to the image sensor systems described above in connection with FIG. 1-5. The sensor array can be situated to receive light entering a pin-hole aperture, such that light illuminating distinct regions of the sensor array originates from a distinct direction. The direction-specific light measured across the sensor array can then be used to construct an image of the surrounding environment. The sensor arrays described herein generally include multiple photo-sensitive elements and associated circuit components (e.g., TFTs, etc.) to drive the photo-sensitive elements. For example, a photodiode in a given photo-sensitive element can be operated to read out voltage values indicative of an amount of received light, and the photodiode may also be reset to clear residual accumulated charge between successive image capture events. By reading out values from the individual photo-sensitive elements, the amount of light measured at various locations across the sensor array can be determined, and an image representing the surrounding environment can then be determined.

In some examples, the light measured at each photo-sensitive element can be represented by data indicative of the amount of light received during a particular exposure event. For example, measurement data may include 8 bit data values, 10 bit data values, etc. depending on the sensitivity and/or gradation of the particular photodiodes and other circuit components employed.

Figure 6C:
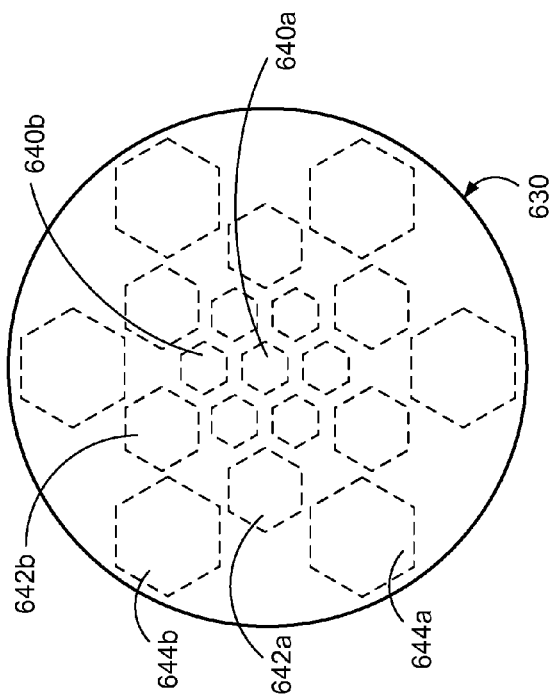
FIG. 6C illustrates an example image sensor array arranged with non-uniform sized photo-sensitive elements.
Figure 6D:
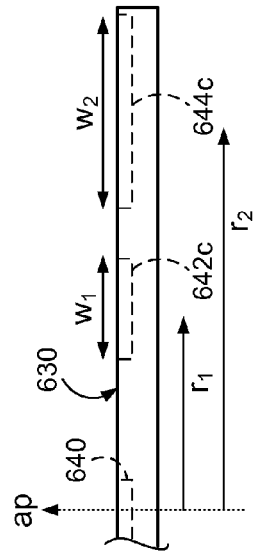
FIG. 6D illustrates a side cross-section view of the image sensor array shown in FIG. 6C.
Figure 6A:
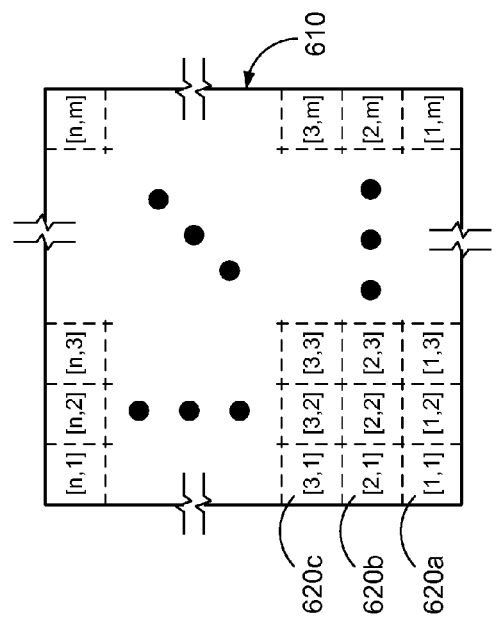
FIG. 6A illustrates an example image sensor array with uniform sized photo-sensitive elements arranged in rows and columns.

FIG. 6A illustrates an example image sensor array 610 with uniform sized photo-sensitive elements 620a-c arranged in rows and columns. The array shown in FIG. 6A is a square or rectangular array with "n" rows and "m" columns. The "n" by "m" array can be square, such as an array with dimensions of 128 by 128, 64 by 64, 20 by 20, etc. Alternatively, the array may be non-square, such as an array with dimensions in a 3:2 ratio, 16:9 ratio, etc.

Figure 6B:
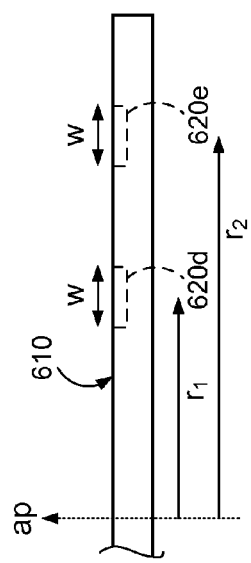
FIG. 6B illustrates a side cross-section view of the image sensor array shown in FIG. 6A.

FIG. 6B illustrates a side cross-section view of the image sensor array 610 shown in FIG. 6A. The cross-section view illustrates an indicator that is directed normal to the plane of the sensor array 610 toward the non-focusing aperture (indicated by "ap" in FIG. 6B). Several photo-sensitive elements 620 at different radial locations from the line directed toward the non-focusing aperture are also illustrated. The first photo-sensitive element 620d is located a radial distance $r_1$ from the line directed toward the non-focusing aperture. The second photo-sensitive element 620e is located a greater radial distance $r_2$ from the line directed toward the non-focusing aperture. Thus, the second photo-sensitive element 620e is further from the non-focusing aperture than the first photo-sensitive element 620d. The two photo-sensitive elements 620d-e have the same radial width "w," as shown in FIG. 6B. The sensor array shown in FIGS. 6A-6B thus has photo-sensitive elements with areas that are independent of displacement from the non-focusing aperture.

FIG. 6C illustrates an example image sensor array 630 arranged with non-uniform sized photo-sensitive elements 640-644. The sensor array 630 is arranged with photo-sensitive elements arranged in substantially concentric zones. The inner zones are populated by photo-sensitive elements with the smallest light receiving areas (e.g., the photo-sensitive elements 640a-b at the central position and immediately adjacent to the central position). Outer zones are populated by photo-sensitive elements with progressively larger sized light receiving areas (e.g., the photo-sensitive elements 642a-b in the zone immediately adjacent to the zone including 640b). An outer-most zone may include photo-sensitive element with even larger light-receiving areas (e.g., the photo-sensitive elements 644a-b).

FIG. 6D illustrates a side cross-section view of the image sensor array 630 shown in FIG. 6C. Similar to FIG. 6B, an outward normal line indicates the direction to the non-focusing aperture. For example, the non-focusing aperture may be centered over the sensor array 630 (e.g., above the center pixel 640a). The cross-sectional view also shows the widths of photo-sensitive elements in different zones of the sensor array 630. A first photo-sensitive element 642c is located at a radial distance $r_1$ from the line indicating the direction to the non-focusing aperture. A second photo-sensitive element 644c is located at a radial distance $r_2$ from the line indicating the direction to the non-focusing aperture. Thus, the second photo-sensitive element 644c is positioned further from the non-focusing aperture than the first photo-sensitive element 642c. As shown in FIG. 6D, the first photo-sensitive element 642c has a light receiving area with width $w_1$, while the second photo-sensitive element 644c has a light receiving area with a greater width $w_2$. The second photo-sensitive element 644c (located further from the non-focusing aperture) therefore has a greater light receiving area than the first photo-sensitive element 642c. The greater light receiving area of the photo-sensitive element 644c may at least partially compensate for the photo-sensitive element receiving relatively less light due to diffraction effects, vignetting, and/or shadowing in light entering the non-focusing aperture at greater angles (e.g., the light ray 564 in FIG. 5B).

Of course, alternative arrangements for sensor arrays with non-uniform photo-sensitive elements can be created. However, the radially-dependent light receiving areas of photo-sensitive elements may provide additional light receiving area to at least partially compensate for the drop off in light transmission to the photo-sensitive elements located relatively further from the non-focusing aperture due to diffraction effects, vignetting, and/or shadowing (e.g., due to the thickness of the inner lip of the aperture). Larger light-receiving areas in the photo-sensitive elements located furthest from the non-focusing aperture can thereby increase the sensitivity of the image sensor system to light entering the aperture at high angles. However, the increased area of the photo-sensitive elements naturally involves a tradeoff in sensor resolution.

4d) Multiple Apertures

Figure 7A:
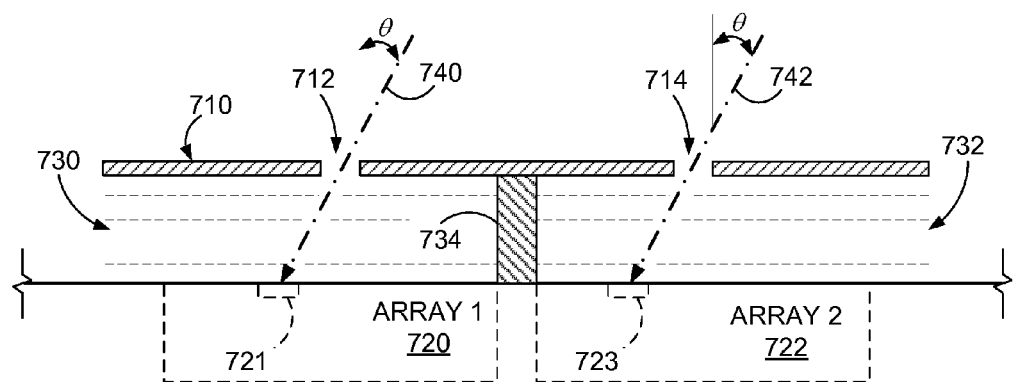
FIG. 7A is a side cross-section view of an example image sensor with multiple sub-arrays each receiving light through a respective pin-hole aperture.

FIG. 7A is a side cross-section view of an example image sensor with multiple sub-arrays each receiving light through a respective pin-hole aperture. A first sub-array 720 and a second sub-array 722 are both integrated into a chip, similar to the image sensor system described in connection with FIG. 5B. An opaque screen 710 is disposed over the sensor arrays 720, 722. The opaque screen 710 can be a metal layer situated on stacked circuit components 730, 732 and/or spacers so as to be suspended over the sensor arrays 720, 722. The opaque screen 710 can optionally be substantially in parallel with a plane of the sensor arrays 720, 722. The stacked circuit components 730, 732 (e.g., TFTs, interconnects, row/column readout/reset lines, etc.) and/or spacers may include substantially transparent dielectric layers, such as silicon dioxide and/or conductive lines, which may include substantially transparent conductors such as indium tin oxide, etc. In some examples, opaque conductive materials such as copper and/or aluminum can be patterned so as to be included in one or more of the conductive layers stacked over the sensor arrays 720, 722. In such examples, the patterned conductive materials may partially interfere with (e.g., block) light transmission to the photo-sensitive arrays 720, 722. In some examples, sidewalls of opaque material can be formed along outer edges of the sensor arrays 720, 722 to isolate the sensor arrays 720, 722 from light other than that which enters the respective apertures 712, 714. Such opaque features can be created from patterned materials included in the outer regions of the stacked circuit components 730, 732 disposed on the sensor arrays 720, 722, for example.

The opaque screen 710 includes apertures 712, 714 situated over the two sensor arrays 720, 722. Light entering the first aperture 712 is received by the first sensor array 720. Light entering the second aperture 714 is received by the second sensor array 722. As shown in FIG. 7A, some of the stacked circuit components and/or spacers can be used to form a non-transparent dividing feature 734 between the two sensor arrays 720, 722. The dividing feature 734 can thereby prevent light entering the first aperture 712 from reaching the second sub-array 722 and vice versa. However, some embodiments may omit the dividing feature 734.

FIG. 7A also illustrates substantially parallel light rays 740, 742 entering each of the apertures 712, 714 and being received by one or more photo-sensitive elements in respective regions 721, 723 of the two sensor arrays 720, 722. The two regions 721, 723 can each be associated with light entering the apertures 712, 714 at an angle θ with respect to the optical axis of the image sensor.

To form an image from the two sub-arrays 720, 722, the measurements from the two sub-arrays 720, 722 can be combined together to, for example, enhance the sensitivity of the image sensor system. For example, the light received at the two regions 721, 723 can be combined together to provide a combined indication of the light incident from the direction indicated by angle θ. Other regions associated with common directions can also be combined together across the two sensor arrays 720, 722 to determine an image based on the measurements made by both sensor arrays 720, 722. Such combination may be performed by an external reader upon receiving data indicating the measurements made by the two sensor arrays 720, 722.

Figure 7B:
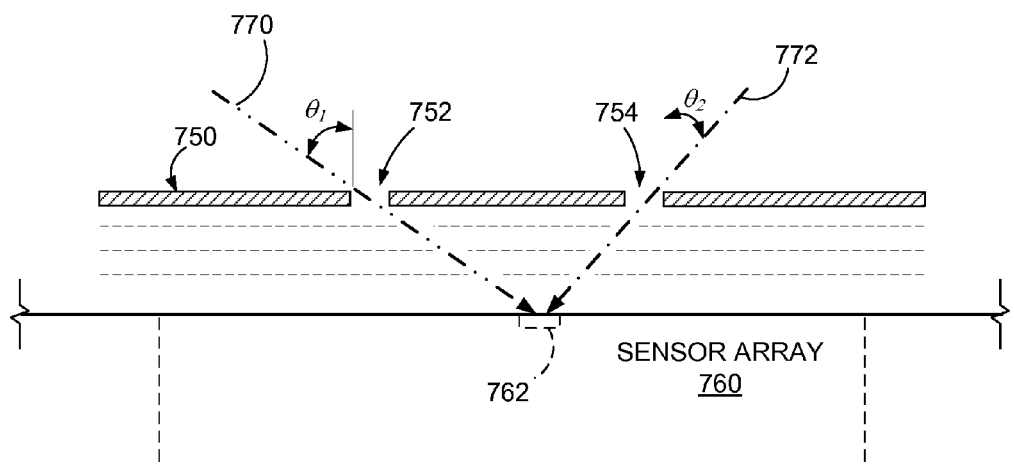
FIG. 7B is a side cross-section view of an example image sensor with multiple pin-hole apertures illuminating a single sensor array.

FIG. 7B is a side cross-section view of an example image sensor with multiple pin-hole apertures 752, 754 illuminating a single sensor array 760. An opaque screen 750 is suspended over the sensor array 760 and can be substantially in parallel to the plane of the sensor array 760. The sensor array 760 can be illuminated simultaneously by light entering the two apertures 752, 754. As shown in FIG. 7B, the light entering the two different apertures can result in partially overlapping illuminated regions on the sensor array. For example, FIG. 7B illustrates a first light ray 770 entering the first aperture 752 at angle $\theta_1$, and a second light ray 772 entering the second aperture 754 at angel $\theta_2$. The two light rays 770, 772 both illuminate a common region 762 of the sensor array 760. As a result, one or more photo-sensitive elements in the sensor array 760 may simultaneously receive light from different directions via the two different apertures 752, 754 (e.g., photo-sensitive elements near the sensor region 762). Post processing routines may be employed to combine the resulting measurements of received light to sort out the direction(s) associated with light received at each photo-sensitive elements and determine an image of the surrounding environment.

In some cases, determining an image using the image sensor system in FIG. 7B may involve correlating light measurements from photo-sensitive elements in regions of the sensor array 760 receiving light from both apertures 752, 754 with regions of the sensor array that receive light from only one aperture, and identifying differences between the two. For example, a region of the sensor array configured to receive light entering aperture 752 at angle $\theta_2$ can be used to determine the fractional amount of the light measured at sensor region 762 with light from the first aperture 752 (at angle $\theta_2$) versus light from the second aperture 754 (at angle $\theta_1$). Image determination routines may employ a variety of different techniques to combine measurements of received light across the sensor array from more than one aperture in potentially overlapping patterns to estimate direction(s) associated with various light measurements, and then use the estimated direction(s) to form an image of the surrounding environment.

V. Example Operations

Figure 8A:
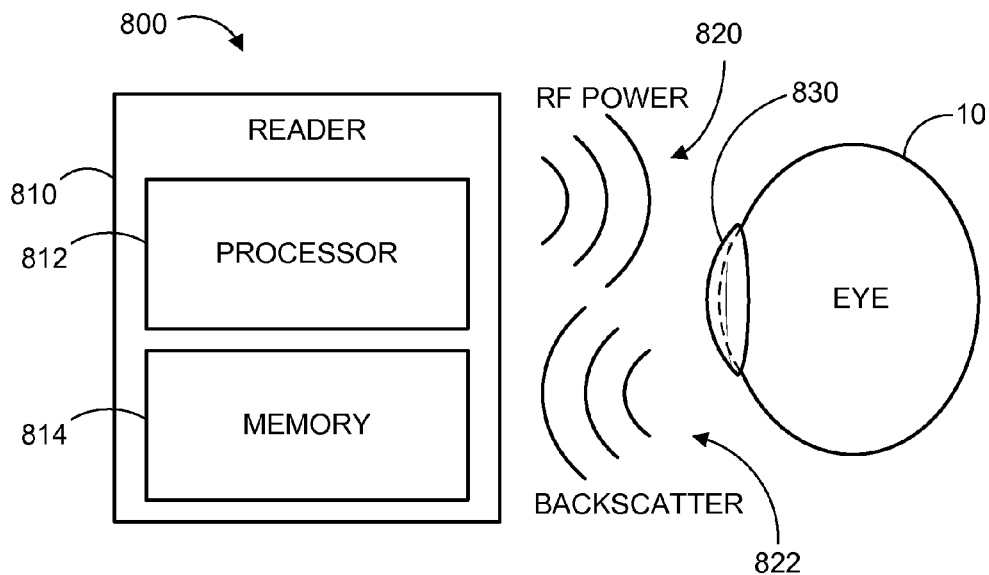
FIG. 8A is a block diagram of an ophthalmic image sensor system operated by an external reader to obtain a series of images over time.

FIG. 8A is a block diagram of a system 800 with an ophthalmic image sensor system 830 operated by an external reader 810 to obtain one or more images from the image sensor. The ophthalmic image sensor 830 is included in an eye-mountable device configured to be contact-mounted over a corneal surface of an eye 10. The ophthalmic image sensor 830 can be operated to measure light received at a photo-sensitive sensor array that enters a non-focusing aperture in an opaque screen, similar to any of the image sensor systems described herein in connection with FIGS. 1-7.

The external reader 810 includes a processing system 812 and a memory 814. The processing system 812 can be a computing system that executes software stored in the memory 814 to cause the system 800 to operate as described herein to obtain one or more image measurements (e.g., by intermittently transmitting a signal to power the ophthalmic image sensor 830 to obtain a measurement of received light and communicate the results as shown in connection with FIGS. 1-5). The external reader 810 can also include an antenna (not shown) for transmitting radio frequency radiation 820 to be harvested by the ophthalmic image sensor 830. The external reader 810 can also receive indications of sensor results 822 transmitted back to the reader by backscatter radiation. For example, the antenna impedance of the ophthalmic electrochemical sensor 830 can be modulated in accordance with the sensor measurement such that the backscatter radiation 822 indicates the sensor measurement.

Once indications of the measured light are received, the external reader 810 can then perform operations to determine an image indicated by the measurements of light received across the sensor array of the ophthalmic image sensor 830. For example, the processing system 812 can execute instructions stored in the memory 814 to associate each light measurement (e.g., brightness value) with a particular direction (e.g., based on location of each photo-sensitive element on the sensor array with respect to the non-focusing aperture). An image of the surrounding environment can then be formed by combining the various light measurements in accordance with their associated directions. The processing system 812 can also execute one or more smoothing, filtering, and/or other image processing routines, and can apply various compensation and/or calibration routines to account for variations among particular photo-sensitive elements (e.g., photodiode variations, TFT variations, etc.) and/or variations across the sensor array (e.g., temperature-based variations, etc.). The external reader 810 can also use the memory 814 to store indications of the resulting images, once determined. The external reader 810 can thus be operated to intermittently power the ophthalmic image sensor 830 so as to obtain a time series of images, such as to construct a video from the subsequently captured images. In some cases, images can be transmitted at a rate of approximately one frame per second, however other rates are possible. In particular, even without adjusting bandwidth constraints in the communication link between the reader 810 and the ophthalmic image sensor 830, enhanced continuous frame rates may be achieved by using an image sensor array with fewer photo-sensitive elements (and thus transmit fewer light measurements) or that measure received light with less precision (and thus transmit fewer bits per light measurement).

Figure 8B:
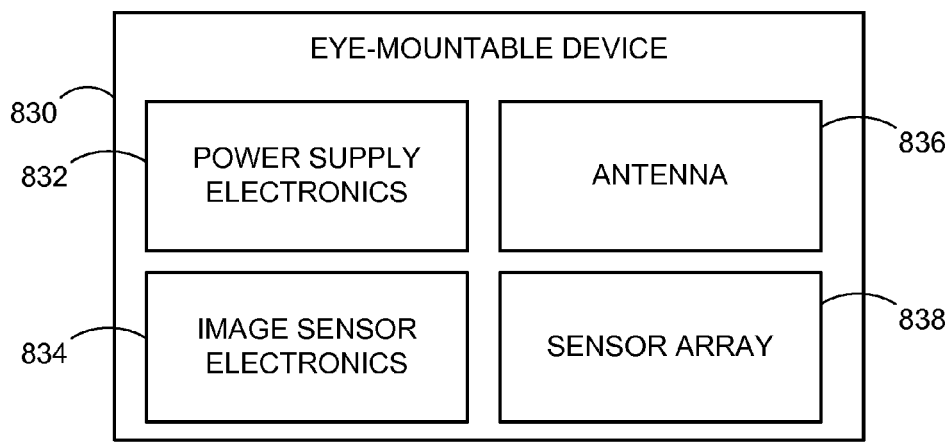
FIG. 8B is a block diagram of the ophthalmic image sensor system described in connection with FIG. 8A.

FIG. 8B is a block diagram of the ophthalmic image sensor 830 described in connection with FIG. 8A. The ophthalmic image sensor 830 can be configured to operate similar to the eye-mountable image capture systems described in connection with FIGS. 3-7 above. Thus, the ophthalmic image sensor 830 can include energy harvesting systems 832 for harvesting energy from incident radiation (and/or other sources) to power image sensor electronics 834. For example, energy from incident radio frequency radiation can be harvested using an antenna 836. Once powered, the image sensor electronics 834 can operate the sensor array 838 to measure light received across the sensor array 838 that enters a non-focusing aperture in an opaque screen. Once measurements are obtained across the sensor array 838, the image sensor electronics 834 can read out the measurements of received light (e.g., by circuits configured to read accumulated voltages on photodiodes in each photo-sensitive element). The measurements of received light can then be wirelessly communicated back to the reader 810 using the antenna 836. For example, the impedance of the antenna 836 can be modulated to characteristically adjust the frequency, phase, and/or amplitude of the backscatter radiation 822 in a manner that can be demodulated by the reader 810.

Moreover, it is particularly noted that while the electronics platform is described herein by way of example as an eye-mountable device or an ophthalmic device, it is noted that the disclosed systems and techniques for small form factor imaging systems can be applied in other contexts as well. For example, contexts in which electronics platforms are operated with low power budgets (e.g., via harvested energy from radiated sources) or are constrained to small form factors (e.g., implantable bio-sensors or other wearable electronics platforms) may employ the systems and processes described herein to capture images of a surrounding environment. In one example, an implantable medical device that includes an image sensor may be encapsulated in biocompatible material and implanted within a host organism. The implantable medical device may include a circuit configured to detect light received by a photo-sensitive sensor array through a pinhole aperture and communicate indications of detected light. Reading and/or control devices can communicate with the implantable medical device to determine the light measured across the array and then use the measurements to determine an image corresponding to the detected light. The configurations disclosed herein that are free of focusing optics, and therefore enable imaging in small form factor applications and simultaneously can address power budget constraints in low power applications by operating via harvested energy.

Figure 9:
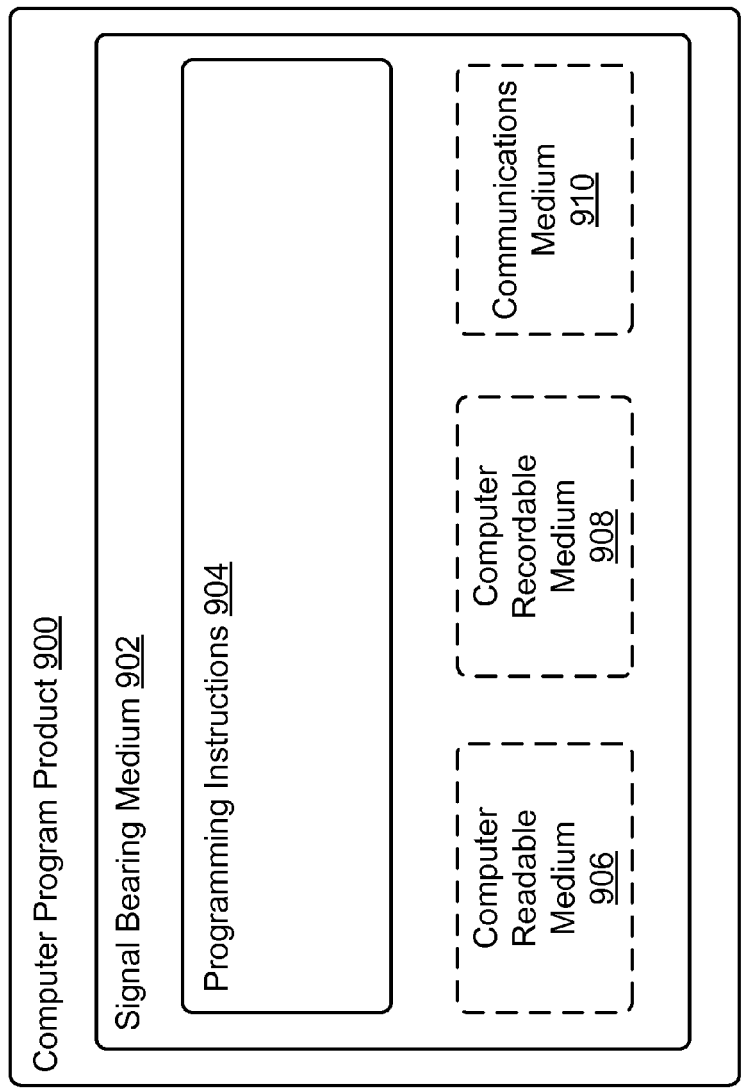
FIG. 9 depicts a computer-readable medium configured according to an example embodiment.

FIG. 9 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions 184 stored on the memory storage 182 of the external reader 180 of the system 100). FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 can be a non-transitory computer-readable medium 906, such as, but not limited to, a hard disk drive, a Compact Disc (CD), a Digital Video Disk (DVD), a digital tape, memory, etc. In some implementations, the signal bearing medium 902 can be a computer recordable medium 908, such as, but not limited to, memory, read/write (R/W) CDs, R/W DVDs, etc. In some implementations, the signal bearing medium 902 can be a communications medium 910, such as, but not limited to, a digital and/or an analog communication medium (e.g., a fiber optic cable, a waveguide, a wired communications link, a wireless communication link, etc.). Thus, for example, the signal bearing medium 902 can be conveyed by a wireless form of the communications medium 910.

The one or more programming instructions 904 can be, for example, computer executable and/or logic implemented instructions. In some examples, a computing device such as the processor-equipped external reader 180 of FIG. 1 is configured to provide various operations, functions, or actions in response to the programming instructions 904 conveyed to the computing device by one or more of the computer readable medium 906, the computer recordable medium 908, and/or the communications medium 910.

The non-transitory computer readable medium 906 can also be distributed among multiple data storage elements, which could be remotely located from each other. The computing device that executes some or all of the stored instructions could be an external reader, such as the reader 180 illustrated in FIG. 1, or another mobile computing platform, such as a smartphone, tablet device, personal computer, etc. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An eye-mountable device comprising:
a transparent polymeric material that can be removably mounted over a corneal surface;
a substrate at least partially embedded in the transparent polymeric material; and
an image sensor disposed on the substrate, wherein the image sensor includes: (i) an opaque screen including a non-focusing aperture, and (ii) a photo-sensitive area occupied by a plurality of photo-sensitive elements, wherein the plurality of photo-sensitive elements includes a first photo-sensitive element located closer to the non-focusing aperture than a second photo-sensitive element, and wherein the first photo-sensitive element occupies less of the photo-sensitive area than the second photo-sensitive element, wherein the non-focusing aperture is smaller than the photo-sensitive area, and wherein each of the photo-sensitive elements receives unfocused light entering the non-focusing aperture from a respective direction.

2. The eye-mountable device according to claim 1, further comprising:
   an antenna disposed on the substrate; and
   a controller electrically connected to the image sensor and the antenna, wherein the controller is configured to (i) control the image sensor to obtain data indicative of light received by the photo-sensitive elements, and (ii) use the antenna to indicate the obtained data.

3. The eye-mountable device according to claim 1, wherein the non-focusing aperture is positioned approximately along an outward normal line passing through a center of the photo-sensitive area.

4. The eye-mountable device according to claim 1, wherein the aperture is positioned approximately equidistant from opposite edges of the photo-sensitive area.

5. The eye-mountable device according to claim 1, wherein the opaque screen is arranged in a plane substantially parallel to the photo-sensitive area.

6. The eye-mountable device according to claim 1, wherein the plurality of photo-sensitive elements includes a plurality of complementary metal oxide semiconductor devices.

7. The eye-mountable device according to claim 6, wherein the complementary metal oxide semiconductor devices are arranged in rows and columns.

8. The eye-mountable device according to claim 1, wherein the image sensor further comprises a second non-focusing aperture.

9. The eye-mountable device according to claim 8, wherein the second non-focusing aperture is arranged such that light passing through the second non-focusing aperture is received by a second separate photo-sensitive area.

10. The eye-mountable device according to claim 1, wherein the opaque screen includes a metalized layer formed on a silicon wafer that includes the plurality of photo-sensitive elements, and wherein the metalized layer is formed on a side of the silicon wafer opposite the side on which the photo-sensitive elements are formed.

11. The eye-mountable device according to claim 1, wherein the opaque screen includes a metal layer at least partially supported by one or more stacked circuit components disposed on the plurality of photo-sensitive elements.

12. A method comprising:
   transmitting an interrogation signal to an eye-mountable device comprising an image sensor including a photo-sensitive area that receives unfocused light entering a non-focusing aperture in an opaque screen, and an antenna, wherein the interrogation signal causes the image sensor to measure light received via the non-focusing aperture by a plurality of photo-sensitive elements occupying the photo-sensitive area, wherein the plurality of photo-sensitive elements includes a first photo-sensitive element closer to the non-focusing aperture than a second photo-sensitive element, and wherein the second photo-sensitive element has a larger light receiving area than the first photo-sensitive element;
   receiving, from the eye-mountable device, an indication of the measured light measured by the plurality of photo-sensitive elements; and
   determining an image based on the received indication, wherein determining the image includes accounting for variations between light receiving areas among the plurality of photo-sensitive elements.

13. The method according to claim 12, wherein determining the image includes associating each of the photo-sensitive elements with a respective direction, and forming an image by combining indications of received light at the plurality of photo-sensitive elements in accordance with the respective directions associated with each.

14. The method according to claim 12, further comprising:
   causing the image sensor to measure light received at the photo-sensitive area during a subsequent interval and transmit an indication of the measured light; and
   determining a subsequent image based on the transmitted indication.

15. The method according to claim 12,
   wherein the image sensor includes a second non-focusing aperture in the opaque screen, wherein the second non-focusing aperture is situated such that light entering the second non-focusing aperture is received by the photo-sensitive area, and
   wherein the determining includes combining indications of light received by the photo-sensitive area from the two separate non-focusing apertures to determine one or more respective directions to associate with light measured by each of the photo-sensitive elements.

16. A non-transitory computer readable storage medium storing instructions that, when executed by one or more processors in a computing device, cause the computing device to perform operations, the operations comprising:
   transmitting an interrogation signal to an eye-mountable device comprising an image sensor including a photo-sensitive area that receives unfocused light entering a non-focusing aperture in an opaque screen, and an antenna, wherein the interrogation signal is configured to cause the image sensor to obtain an image by measuring light received via the non-focusing aperture by a plurality of photo-sensitive elements occupying the photo-sensitive area, wherein the plurality of photo-sensitive elements includes a first photo-sensitive element closer to the non-focusing aperture than a second photo-sensitive element, and wherein the second photo-sensitive element has a larger light receiving area than the first photo-sensitive element;
   receiving, from the eye-mountable device, an indication of the measured light measured by the plurality of photo-sensitive elements; and
   determining an image based on the received indication, wherein determining the image includes accounting for variations between light receiving areas among the plurality of photo-sensitive elements.

17. The non-transitory computer readable storage medium according to claim 16, wherein determining the image includes associating each of the photo-sensitive elements with a respective direction, and forming an image by combining indications of received light at the plurality of photo-sensitive elements in accordance with the respective directions associated with each.

* * * * *